United States Patent
Kohashikawa et al.

(10) Patent No.: US 7,839,091 B2
(45) Date of Patent: Nov. 23, 2010

(54) LIGHT SOURCE CONTROL DEVICE, ILLUMINATON DEVICE, AND LIQUID CRYSTAL DISPLAY DEVICE

(75) Inventors: Seiji Kohashikawa, Mie (JP); Toshiyuki Fujine, Tochigi (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 383 days.

(21) Appl. No.: 12/063,575

(22) PCT Filed: Feb. 3, 2006

(86) PCT No.: PCT/JP2006/301832

§ 371 (c)(1),
(2), (4) Date: Feb. 11, 2008

(87) PCT Pub. No.: WO2007/020720

PCT Pub. Date: Feb. 22, 2007

(65) Prior Publication Data

US 2009/0140656 A1 Jun. 4, 2009

(30) Foreign Application Priority Data

| Aug. 12, 2005 | (JP) | 2005-234307 |
| Nov. 1, 2005 | (JP) | 2005-317849 |
| Nov. 30, 2005 | (JP) | 2005-344801 |

(51) Int. Cl.
*H05B 37/05* (2006.01)

(52) U.S. Cl. ............... 315/151; 315/155; 315/157; 362/225; 362/276

(58) Field of Classification Search ............... 315/151, 315/291, 300–302, 307–308, 363, 155, 157; 362/221–225, 276, 800; 345/82–84, 102, 345/204

See application file for complete search history.

(56) References Cited

U.S. PATENT DOCUMENTS

| 5,744,913 | A * | 4/1998 | Martich et al. ............ 315/158 |
| 6,069,676 | A | 5/2000 | Yuyama et al. |
| 6,630,801 | B2 * | 10/2003 | Schuurmans ............ 315/307 |
| 6,964,500 | B2 | 11/2005 | Sakai et al. |
| 7,213,962 | B2 * | 5/2007 | Chen ......................... 362/27 |
| 7,656,398 | B2 * | 2/2010 | Sakai et al. .............. 345/204 |
| 2005/0111225 | A1 * | 5/2005 | Kim et al. ................ 362/276 |

FOREIGN PATENT DOCUMENTS

JP 10-49074 A 2/1998

(Continued)

*Primary Examiner*—Douglas W Owens
*Assistant Examiner*—Tung X Le
(74) *Attorney, Agent, or Firm*—Birch, Stewart, Kolasch & Birch, LLP

(57) ABSTRACT

A light emission device capable of holding a uniform color in various environments is provided. A light source control device has a light detection device for detecting emission brightness of light sources that emit different colors and controlling emission brightness of at least one light source of the light sources based on the detection result of the light detection device. A through-hole is formed in a reflection member for reflecting light emitted from the light source, and the reflection is in a predetermined direction. The light detection device is provided across the reflection member from the light source, and the light propagation member is provided at the through-hole.

17 Claims, 32 Drawing Sheets

FOREIGN PATENT DOCUMENTS

| | | |
|---|---|---|
| JP | 11-260568 A | 9/1999 |
| JP | 2002-214039 A | 7/2002 |
| JP | 2002-344031 A | 11/2002 |
| JP | 2003-330424 A | 11/2003 |
| JP | 2004-21147 A | 1/2004 |
| JP | 2004-199968 A | 7/2004 |
| JP | 2004-342454 A | 12/2004 |
| JP | 2005-19420 A | 1/2005 |
| JP | 2005-71702 A | 3/2005 |

* cited by examiner

FIG. 7A
FIG. 7B
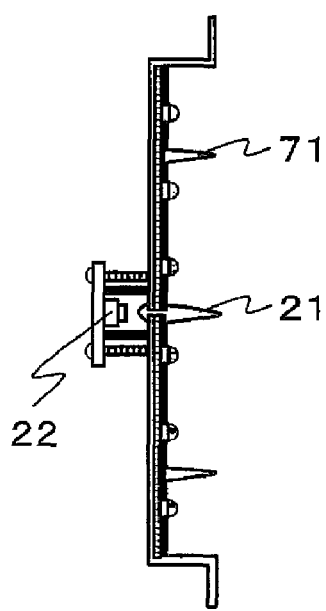
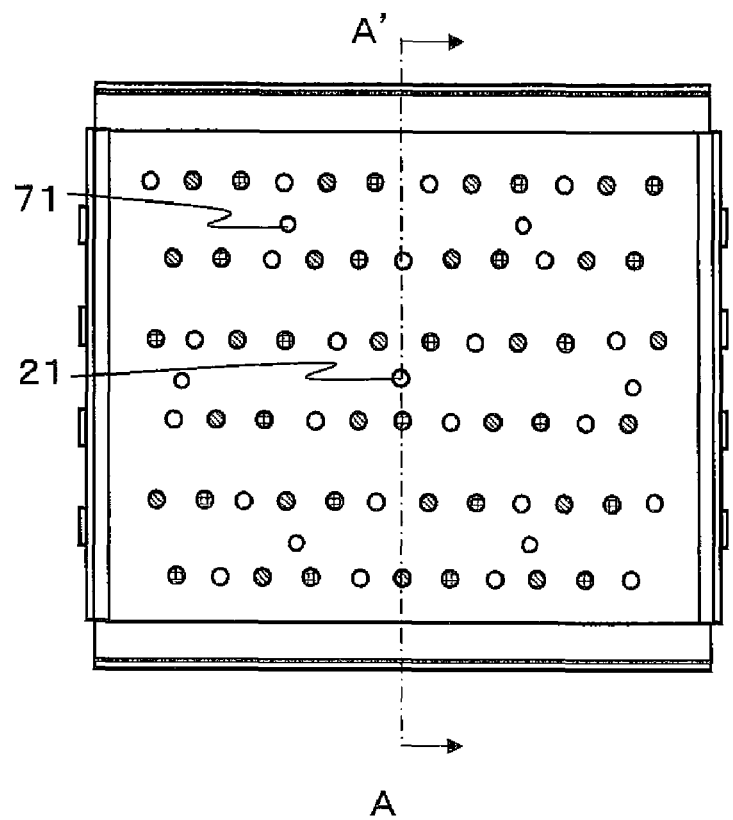

FIG. 9A  FIG. 9B
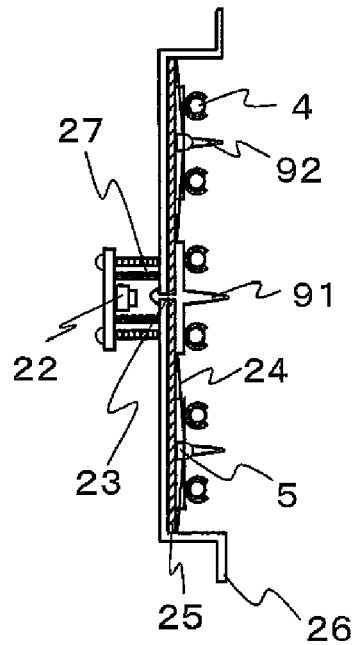
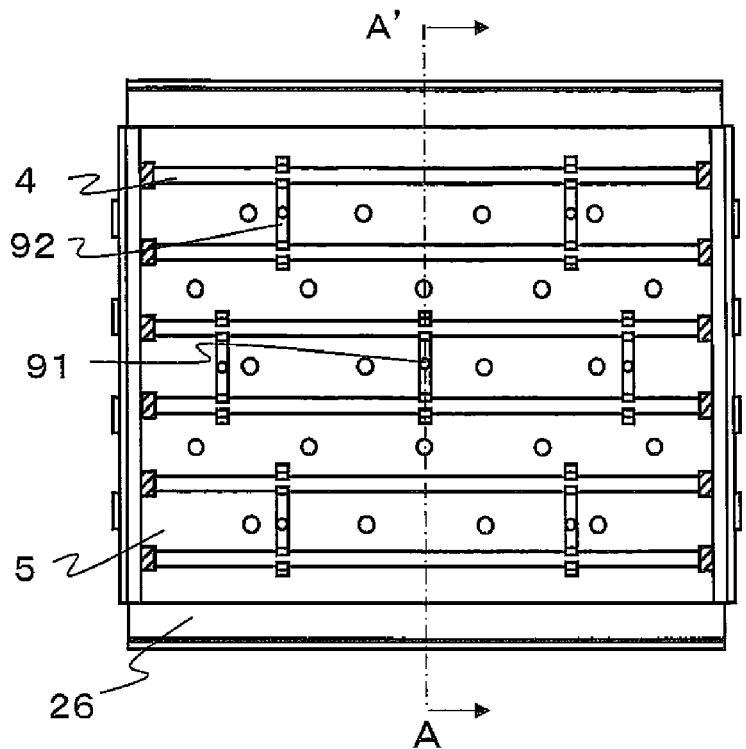
FIG. 10
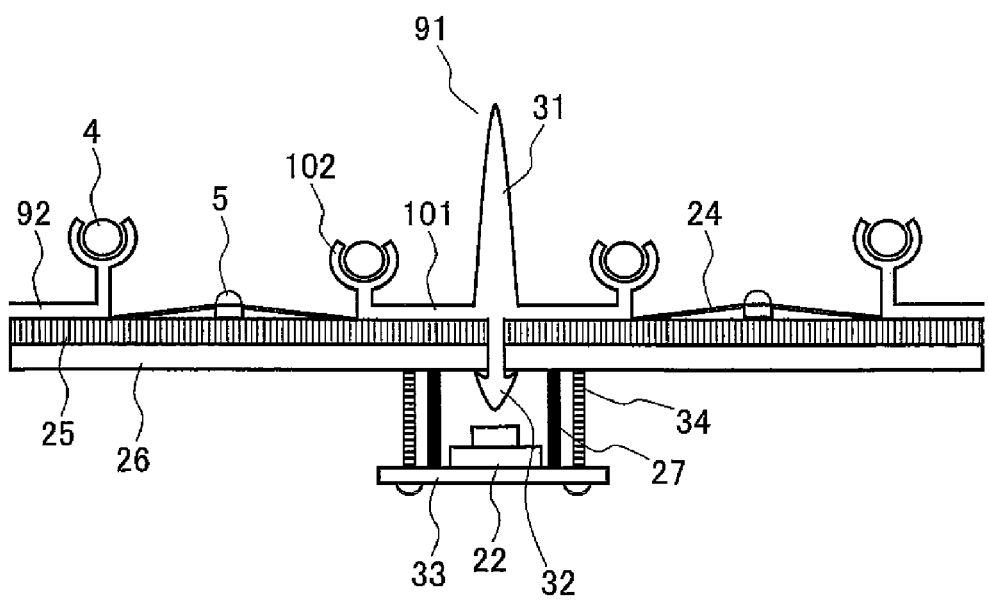

FIG. 14A
FIG. 14B
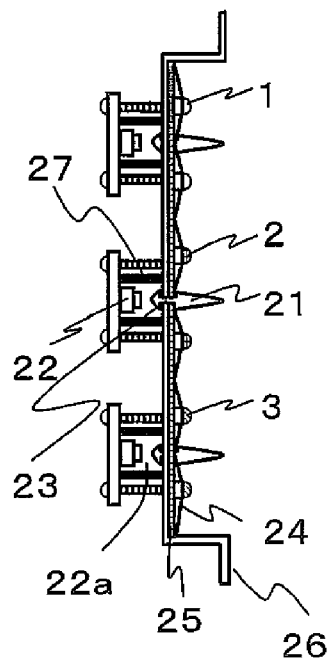
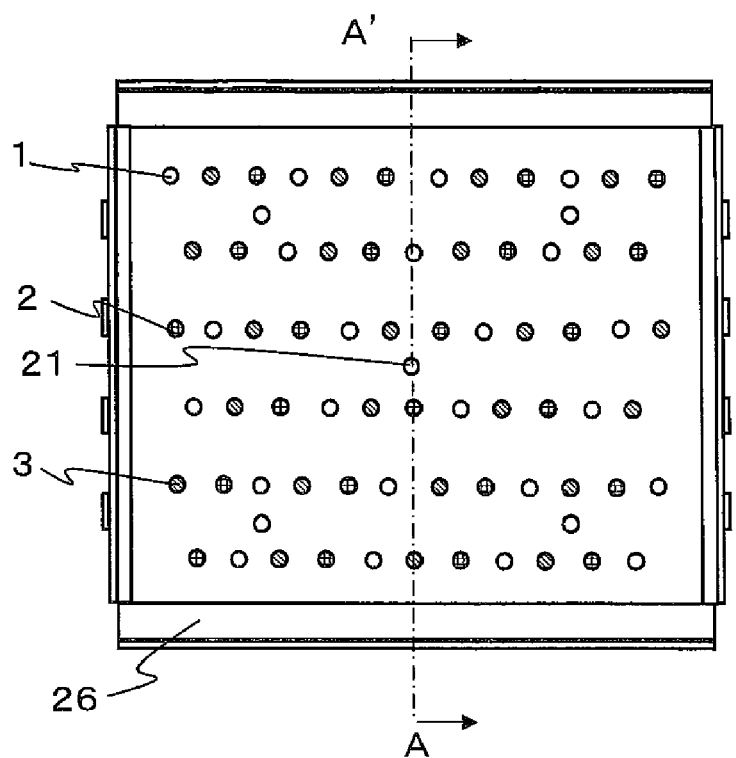

FIG. 16A
FIG. 16B
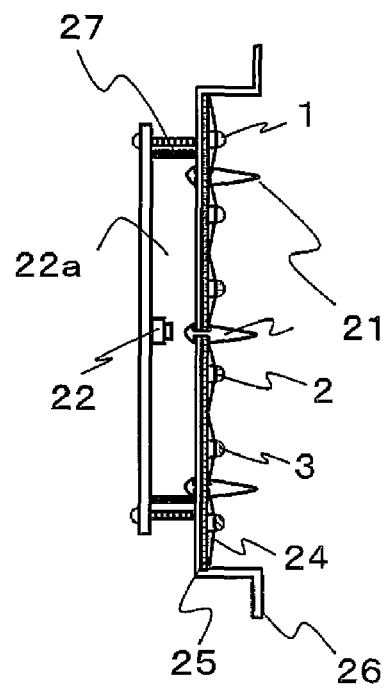
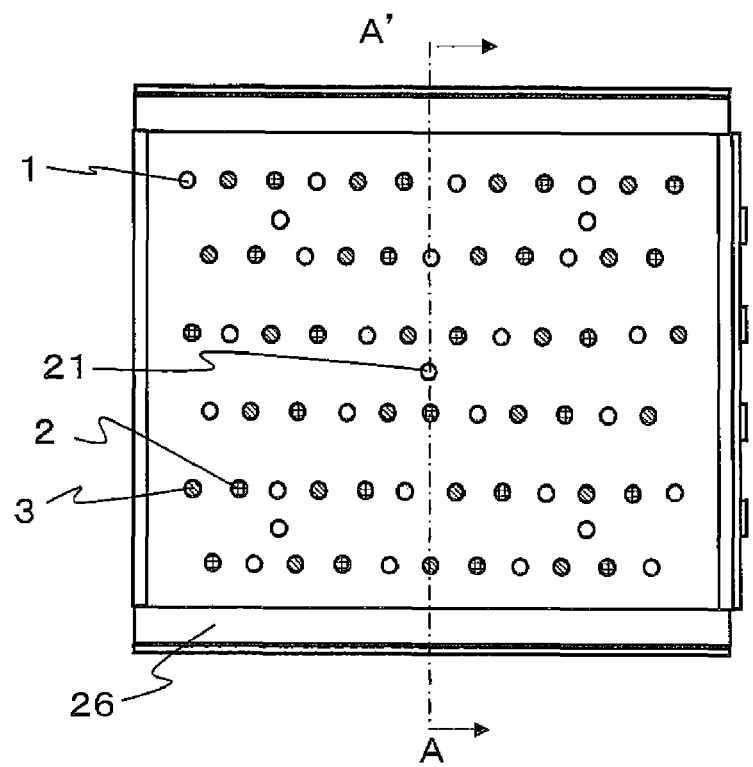

FIG. 19A
FIG. 19B
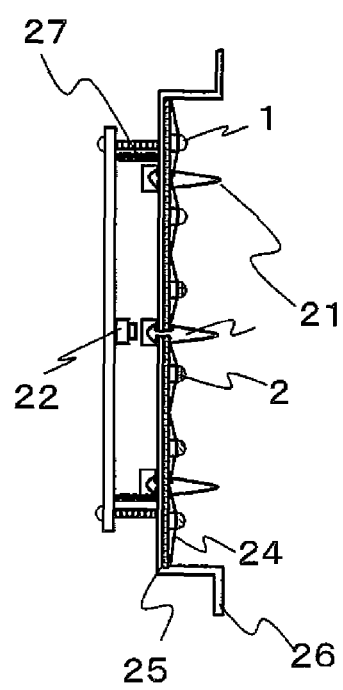
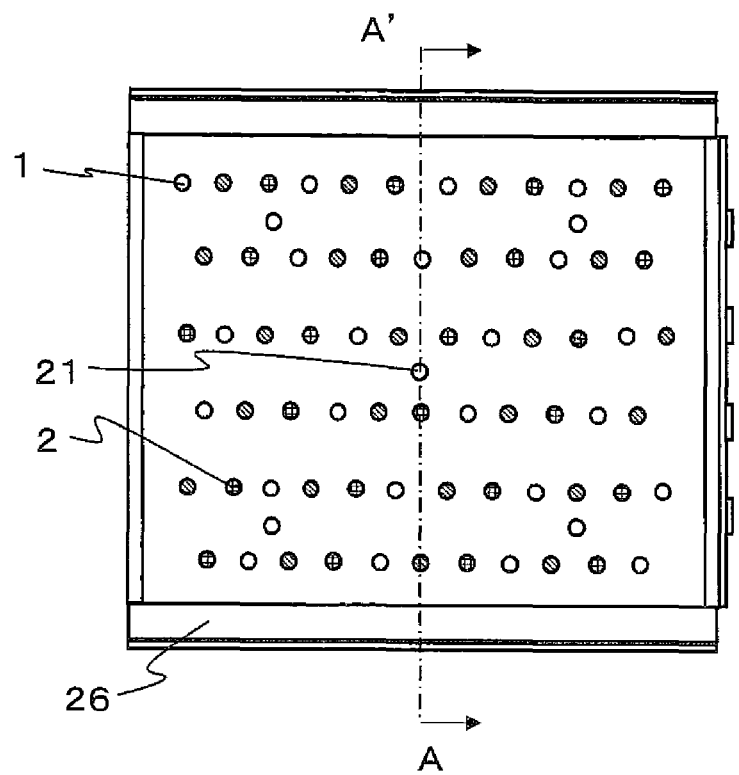

FIG. 23A
FIG. 23B
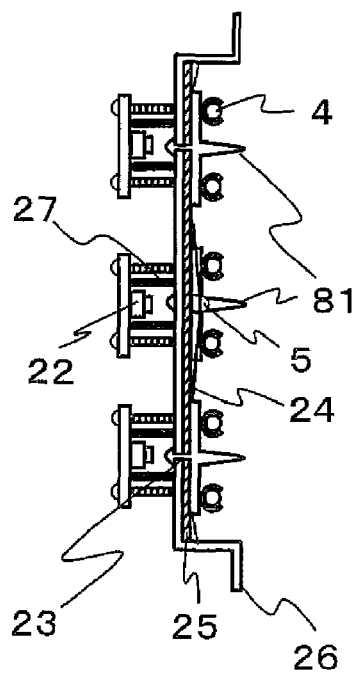
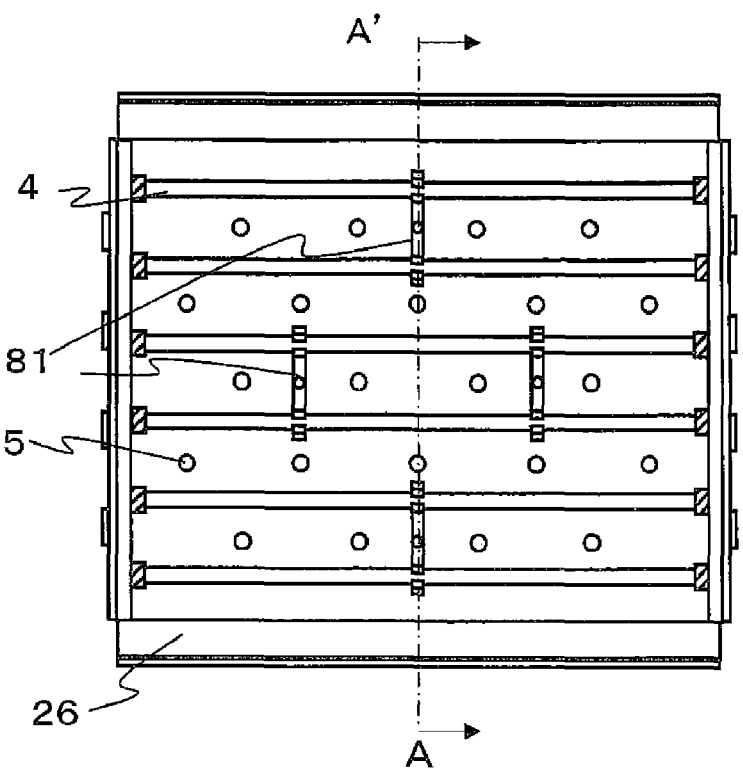

LIGHT SOURCE CONTROL DEVICE, ILLUMINATON DEVICE, AND LIQUID CRYSTAL DISPLAY DEVICE

BACKGROUND OF THE INVENTION

1. Field of the Invention

The present invention relates to a technique for controlling emission brightness of a light source to correct a deviation in chromaticity.

2. Description of the Related Art

In a passive type image display device which displays an image on a panel by use of light emitted from a light source to the panel, currently, a white cold cathode fluorescent lamp is mainly used as the light source.

On the other hand, a light emitting diode (hereinafter abbreviated as "LED") has the following advantages. Specifically, the LED can emit light of high brightness. The color reproduction range of the LED can be broadened, and further the LED has a long operation life. Moreover, with an improvement in conversion efficiency, which has conventionally been low, as well as a reduction in costs, the LED has been used as a light source of the above-mentioned passive type image display device.

FIGS. 29A and 29B show a backlight device (direct type) of a liquid crystal display device, which is a passive type image display device having LEDs used as light sources. The backlight device includes LEDs 291, 292, and 293 which emit light of three different colors as red light sources (hereinafter referred to as "R light sources"), green light sources (hereinafter referred to as "G light sources"), blue light sources (hereinafter referred to as "B light sources"), respectively. A desired color image is displayed by mixing light of the three different colors into white light, and then emitting the resultant light to the liquid crystal panel disposed in front of the backlight device.

In order to allow the backlight device to function as an appropriate surface light source emitting light to the liquid crystal panel without unevenness in brightness or in color, an optical member 295, such as a diffuser, is disposed between the light sources and the liquid crystal panel, for converting light from the light sources to obtain such a desired surface light source. Since the optical member 295 is in a sheet form or a plate form so that the thickness of a completed crystal display device can be made as small as possible, the optical member 295 is gradually bent or deformed by heat from the light sources and circuit components. Accordingly, for the purpose of preventing the optical member 295 from being bent or deformed to the light source side, the backlight device is provided with projections 294 therein which project to the optical member side (liquid crystal panel side) higher than the light sources.

Here, an LED has a problem that the display performance thereof is deteriorated by changes in brightness and chromaticity, caused by the environment in which the LED is used, particularly, by the temperature. In addition, the display performance also changes in accordance with the usage period of the LED. For reference, FIG. 30 shows a graph indicating a brightness-temperature characteristic of an LED. As can be seen from FIG. 30, the brightness of an LED tends to deteriorate along with a rise in the temperature, and an influence of the deterioration in brightness is most prominent in the R light source (characteristic shown by a chain double-dashed line).

Thus, when LEDs are used as light sources, chromaticity of the light sources changes in accordance with the elapse of time and also with a rise in the temperature, thereby causing a deviation in the chromaticity. To prevent this deviation, emission brightness (intensity) of the light sources is monitored at regular intervals to correct deviations in brightness and chromaticity. In this way, the color of light to be emitted to the liquid crystal panel is maintained to be a desired color of white.

For example, Patent document 1 discloses a color display device which includes a means for adjusting the color balance (particularly the white color balance). This color display device includes a so-called field sequential backlight device in which light sources of R, G and B that emit different colors of light are switched sequentially to produce a specific color of light. In this color display device, the color balance adjustment is implemented by monitoring the brightness level of each of the light sources in the backlight device.

As shown in FIG. 31, the color display device disclosed in Patent Document 1 includes R, G and B light sources 311, 312 and 313, while optical sensors 314, 315 and 316 are respectively disposed in the vicinities of the LEDs. The optical sensors 314, 315 and 316 detect the brightness levels of the respective LEDs at the time of light emission, and then convert the brightness levels into corresponding voltage values. Then, each of the converted voltage values is compared with a corresponding reference voltage value predetermined for each of the LEDs. The color display device controls the current flowing in each of the LEDs on the basis of whether the voltage value is higher or lower than the reference voltage value, and of the difference between the voltage value and the reference voltage value. The color display device thus maintains the color balance by adjusting the brightness level of each of the LEDs.

Patent Document 1 also discloses a case of providing a single optical sensor having a selector switch for selecting the reference value, instead of providing optical sensors for the respective LEDs. By sequentially switching the selector switch, a comparison is made between a reference value predetermined for each LED and a detected value from the optical sensor, and thus each of the LEDs is controlled.

In addition, Patent Document 1 discloses the following other arrangement examples of the position of the optical sensor, under an assumption that the position shown in FIG. 31 is the standard arrangement position. In a case where there is no space on a substrate to dispose the optical sensor, the sensor may be disposed in a space provided in the reflector frame as in FIG. 32A, or be disposed on a wall surface of the reflector frame as in FIG. 32B. In a case where arrangement of the LEDs is limited so that a sensor cannot be disposed inside the LED box, the sensor may be disposed on the diffuser in a portion that does not interfere with the projected light as in FIG. 32C. Although not a device to detect actual light, a photocoupler consisting of an LED having the same property as those used in the illumination portion and the optical sensor may be disposed outside the illumination portion as in FIG. 32D. In a case where it is difficult to even dispose the photocoupler, the sensor portion may be connected with the illumination portion by optical fiber as in FIG. 32E.

Patent Document 2 discloses a configuration including a plurality of LEDs 331 emitting light of a single color, and a photo detection element 332, all of which are covered with a transparent resin layer 333, as shown in FIGS. 33A and 33b. With this configuration, the photo detection element can detect light propagated through the transparent resin layer. Hence, emission intensity can be appropriately detected with a single photo detection element disposed for the plurality of LEDs.

Patent Documents 3 to 5 disclose so-called side edge type liquid crystal display devices in which light is guided evenly to form a surface by use of a transparent light guiding plate, and the light is guided to the liquid crystal panel to display an image. In this liquid crystal display device, since a white color is obtained by mixing a plurality of luminescent colors by use of the transparent light guiding plate, an ideal white light is maintained by detecting the mixed white color and performing feedback control by use of a deviation from the ideal white light.

Patent Document 3 describes that it is most preferable to dispose the sensor on the same surface of the light guiding plate as the surface on which light from the light source is incident, since light which has traveled the longest distance through the light guiding plate and which is evenly mixed can be detected.

Meanwhile, Patent Document 4 describes that it is preferable to dispose the sensor on a surface other than the light incident surface such that light from the light source cannot be interfered.

Patent Document 5 points out a problem that when light from a specific light source enters a sensor from a light guiding plate, brightness of incident light having a certain angle is high, and an influence of this certain angle obstructs the appropriate detection of light by the planar light source. For prevention of this problem, Patent Document 5 describes provision of a light shielding member that shields light that enters at an angle not less than a predetermined angle before the light enters the sensor.

Patent Document 6 also describes a technique for detecting light by a sensor, the light transmitted through a light guiding plate as in FIG. 34. The light emitted from an LED light source 341 is made even inside the backlight 342, and light from a region including reflection dots is detected by a sensor 343. Then, according to the detection result, an emission controller 344 is configured to control emission intensity of the light source 341.

Patent Document 1: Japanese Patent Application Laid-open Publication No. Hei 10-49074

Patent Document 2: Japanese Patent Application Laid-open Publication No. 2002-344031

Patent Document 3: Japanese Patent Application Laid-open Publication No. Hei 11-260568

Patent Document 4: Japanese Patent Application Laid-open Publication No. 2004-21147

Patent Document 5: Japanese Patent Application Laid-open Publication No. 2004-199968

Patent Document 6: Japanese Patent Application Laid-open Publication No. 2004-342454

SUMMARY OF THE INVENTION

Problems to be Solved by the Invention

The technique disclosed in Patent Document 1 includes the following problems particularly of arrangement locations. In the case of detecting direct light from LEDs as shown in FIGS. 32A and 32B, a mixed color is difficult to detect. It is undesirable to arrange the sensor on the diffuser as in FIG. 32C, since the sensor interferes with the uniformly emitted light. In particular, in a case where a light emitting device is used as a backlight of a liquid crystal panel, it is undesirable because the sensor is arranged on the course of guiding the light to the liquid crystal panel, influencing the image to be displayed on the liquid crystal panel. The photocoupler as in FIG. 32D causes a rise in costs since an additional LED is required. Although the light guide formed of optical fiber as in FIG. 32E is mentioned as being able to be disposed anywhere, the light guide disposed above the LEDs also interferes with the uniformly emitted light as similar to FIG. 32C. Alternatively, if the light guide is disposed in an edge of the device, detection is performed mainly for the light at the edge, and appropriate detection of mixed light cannot be performed.

Regarding the technique disclosed in Patent Document 2, since the sensor is disposed on the same substrate as the substrate on which the LEDs are disposed, the LED substrate needs to be enlarged. In addition, although detection is performed on light having been transmitted through a transparent substrate, any of the LEDs are disposed in the vicinity of the sensor, and the sensor tends to be influenced by brightness of the light of an LED that is disposed closest to the sensor.

Accordingly, it is preferable that the sensor is disposed on the opposite side to the light source side across the reflective member, and that the sensor detects light having passed through a through hole provided in the reflective member. This is because provision of the sensor in such a location makes it possible to detect indirect light having been propagated in the backlight device for a while and then having passed through the through hole provided in the reflector. In this regard, although not for the purpose of detecting indirect light, a configuration in which a sensor is disposed on the opposite side to the light source side across the reflective member is disclosed in paragraph [0040] of Patent Document 6. Here, it is described that a sensor 343 disposed opposite to a liquid crystal panel disposition side of a light guiding panel 342, may otherwise be disposed on the back surface of the reflective member.

Note that it is preferable to detect a more securely mixed light, even in the configuration where the sensor is disposed on the opposite side to the light source side across the reflective member.

The techniques disclosed in Patent Documents 3 to 5 are descriptions related to a so-called side edge type display device using a light guiding plate. Hence, it will be quite difficult to apply the techniques to a display device of another type.

The present invention has been made in consideration of these problems, and aims to provide a light source control device capable of appropriately detecting emission brightness of a light source, and capable of correcting the emission brightness of the light source.

Means for Solving the Problems

In order to achieve the above-mentioned objects, a light source control device according to the present invention includes a light detection device that detects emission brightness of a plurality of light sources emitting different colors of light, and controls emission brightness of at least one of the plurality of light sources on the basis of a detection result of the light detection device. The light source control device is configured so that: a through hole is provided to a reflective member that reflects light emitted from the light source in a predetermined direction; the light detection device is provided on the opposite side to the light source side across the reflective member; and a light propagation member through which light from the light source can be propagated is provided to the through hole.

Here, it is preferable that the light propagation member include a convex portion and that the convex portion be fitted to the through hole.

The light propagation member preferably has a height higher than the light source. The light propagation member functions effectively as a light collecting means with this configuration.

Moreover, the light detection device may be configured to detect light having been separated by a light separating means after being transmitted through the through hole.

Then, a housing room for housing the light detection device is provided on the opposite side to the light source side of the reflective member, so as to prevent light emitted from the light source from passing through the housing room.

Additionally, the reflective member may include a plurality of aforementioned through holes.

A configuration may be employed where a light propagation member through which light from the light source can be propagated, is provided to at least one of the plurality of through holes.

It is preferable that at least one of the propagation members has a height higher than the light source.

A configuration may be employed where the light source control device includes, for each of the plurality of through holes, an opening and closing means capable of individually controlling whether or not to release light passing through the corresponding through hole to the light detection means.

A configuration may be employed where the light source control device includes, for each of the plurality of through holes, a transmission-wavelength selecting means that selects a transmission wavelength of light passing through the corresponding through hole.

The light source control device may include, on the opposite side to the light source side of the reflective member, a back-surface light guiding body that guides light having passed through at least one of the plurality of through holes to the light detection means.

The light source control device may include, on the opposite side to the light source side of the reflective member, a housing room for housing the light detection device, the housing room having a size that covers the arrangement area of the plurality of through holes. Here, light emitted from the light source is preferably prevented from passing through the housing room.

The light source control device preferably includes a plurality of aforementioned light detection devices.

A configuration may be employed where the light source control device includes a plurality of light propagation members through which light from the light source can be propagated, and the light beams having passed through the plurality of light propagation members are detected by the plurality of light detection means.

It is preferable that at least one of the plurality of light propagation members has a height higher than the light source.

The light source control device preferably includes, on the opposite side to the light source side of the reflective member, a plurality of housing rooms for respectively housing the plurality of light detection devices. Here, light emitted from the light source is preferably prevented from passing through each of the housing rooms.

A configuration may be employed where the light source includes an LED and a fluorescent lamp, while the light propagation member includes a base substrate and a plurality of holding parts. With this configuration, a positional relationship of the fluorescent lamp is maintained at a predetermined spacing by the plurality of holding parts.

The present invention provides an illumination device using any of the above-mentioned configurations.

Further, the present invention provides a liquid crystal display device including the illumination device and a liquid crystal panel.

EFFECTS OF THE INVENTION

With the above configuration, emission brightness of a light source can be appropriately detected and the emission brightness of the light source can be corrected. Accordingly, a light emitting device capable of maintaining a uniform color under various environments can be provided.

BRIEF DESCRIPTION OF THE DRAWINGS

FIG. 7A is a side view of another example of a backlight device of the first embodiment of the present invention.

FIG. 7B is a front view of another example of a backlight device of the first embodiment of the present invention.

FIG. 9A is a side view of a backlight device of the second embodiment of the present invention.

FIG. 9B is a front view of the backlight device of the second embodiment of the present invention.

FIG. 10 is a diagram showing a configuration of a light guiding body and a periphery thereof in the second embodiment of the present invention.

FIG. 14A is a side view of a backlight device of a third embodiment of the present invention.

FIG. 14B is a front view of the backlight device of the third embodiment of the present invention.

FIG. 16A is a side view of a backlight device of a fourth embodiment of the present invention.

FIG. 16B is a front view of the backlight device of the fourth embodiment of the present invention.

FIG. 19A is a side view of a backlight device of a fifth embodiment of the present invention.

FIG. 19B is a front view of the backlight device of the fifth embodiment of the present invention.

FIG. 23A is a side view of a backlight device of a modified example of the third embodiment of the present invention.

FIG. 23B is a front view of the backlight device of the modified example of the third embodiment of the present invention.

DETAILED DESCRIPTION OF THE INVENTION

First Embodiment

Figure 1:
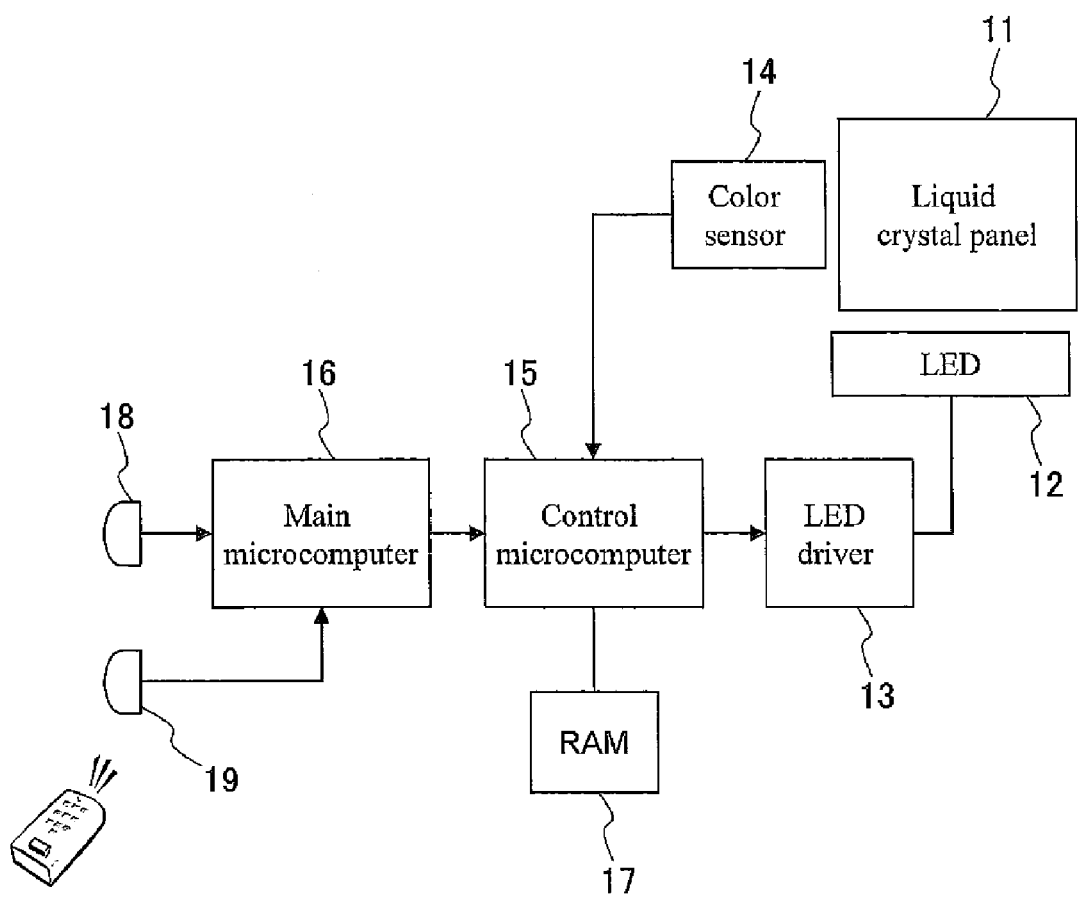
FIG. 1 is a block diagram showing a liquid crystal display device of a first embodiment of the present invention.

A description will be given for a liquid crystal display device as an example of a light source control device according to the present invention. FIG. 1 is a block diagram of the liquid crystal display device according to the embodiment.

The liquid crystal display device includes: a liquid crystal panel 11 for displaying an image; LEDs 12 as light sources for backlighting the liquid crystal panel 11; an LED driver 13 for driving the LEDs 12; a color sensor 14 for detecting emission intensity of each luminescent color of a plurality of LEDs 12; a control microcomputer 15 for giving a drive signal for the LEDs 12 to the LED driver 13; a main microcomputer 16 for giving control information for the LEDs 12 to the control microcomputer 15, on the basis of a detection result from a remote controller signal receiver 19 that detects instruction information, from an illuminance sensor 18 that detects ambient light and from a remote controller of a user; and a RAM 17 for housing a reference value of emission intensity (emission brightness) of each luminescent color to be compared with a detection result of the color sensor 14, or the like.

Figure 2A:
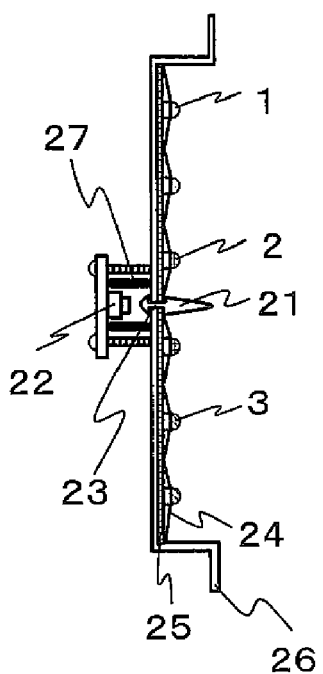
FIG. 2A is a side sectional view taken along the line A-A' (FIG. 2B) of a backlight device according to the first embodiment of the present invention. The other side sectional views to be shown in the drawings below are also taken along the line A-A'.
Figure 2B:
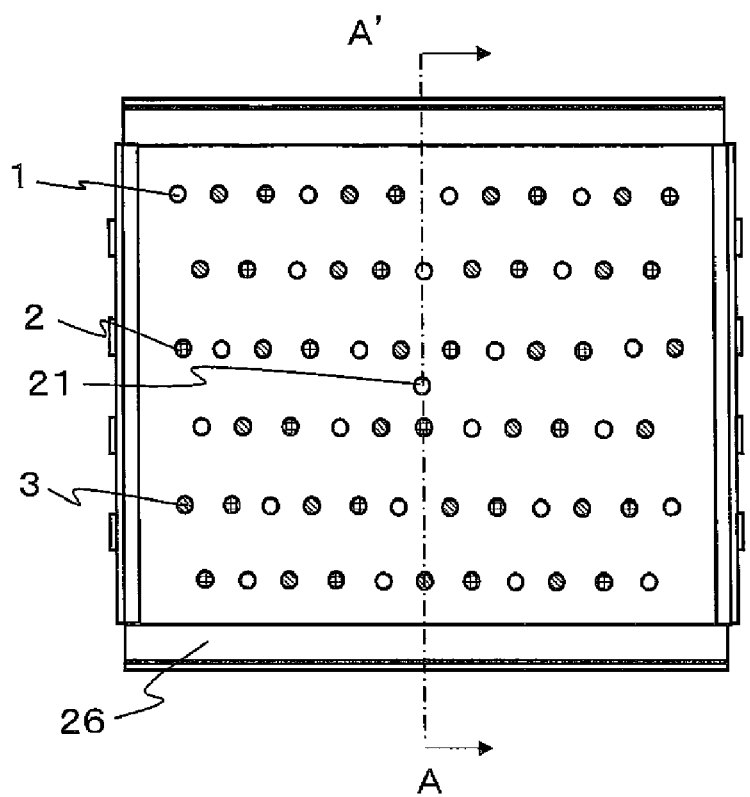
FIG. 2B is a front view of the backlight device of the first embodiment of the present invention.

FIGS. 2A and 2B are outline views of a backlight device serving as an illumination device according to the present invention. FIG. 2B is a front view of the backlight device serving as an illumination device obtained by removing a liquid crystal panel and an optical member from the liquid crystal display device. FIG. 2A is a sectional view of the backlight device taken along a dashed line A-A' in the front view of FIG. 2B. The same relationship is applied to the front and side-sectional views to be shown below.

A chassis 26 is formed in a size that can house a plurality of light sources, and a light source arrangement substrate 25 is mounted to fixedly arrange the light sources on a bottom surface inside the chassis 26. Moreover, a reflector 24 is provided on the light source arrangement substrate 25. The reflector 24 reflects light emitted from the light sources to a predetermined direction, such as the liquid crystal panel side and the optical member side.

The backlight device includes a plurality of light sources emitting different colors of light, which are mixed to produce a certain color. The mixed color is guided to an optical member (not shown) such as a diffuser disposed in front of the backlight device, converted to obtain a desired surface light source by using the optical member, and is then emitted to the liquid crystal panel (not shown).

In the configuration of the present embodiment, colors of red, green and blue are emitted as the plurality of different luminescent colors, and as the R light sources, the G light sources and the B light sources to emit the colors of red, green and blue, red LEDs 1, green LEDs 2, and blue LEDs 3 are provided, respectively. Light beams of these three kinds of colors are emitted at an appropriate emission intensity ratio, are mixed to produce a white color and then guided to the optical member and the liquid crystal panel.

Figure 30:
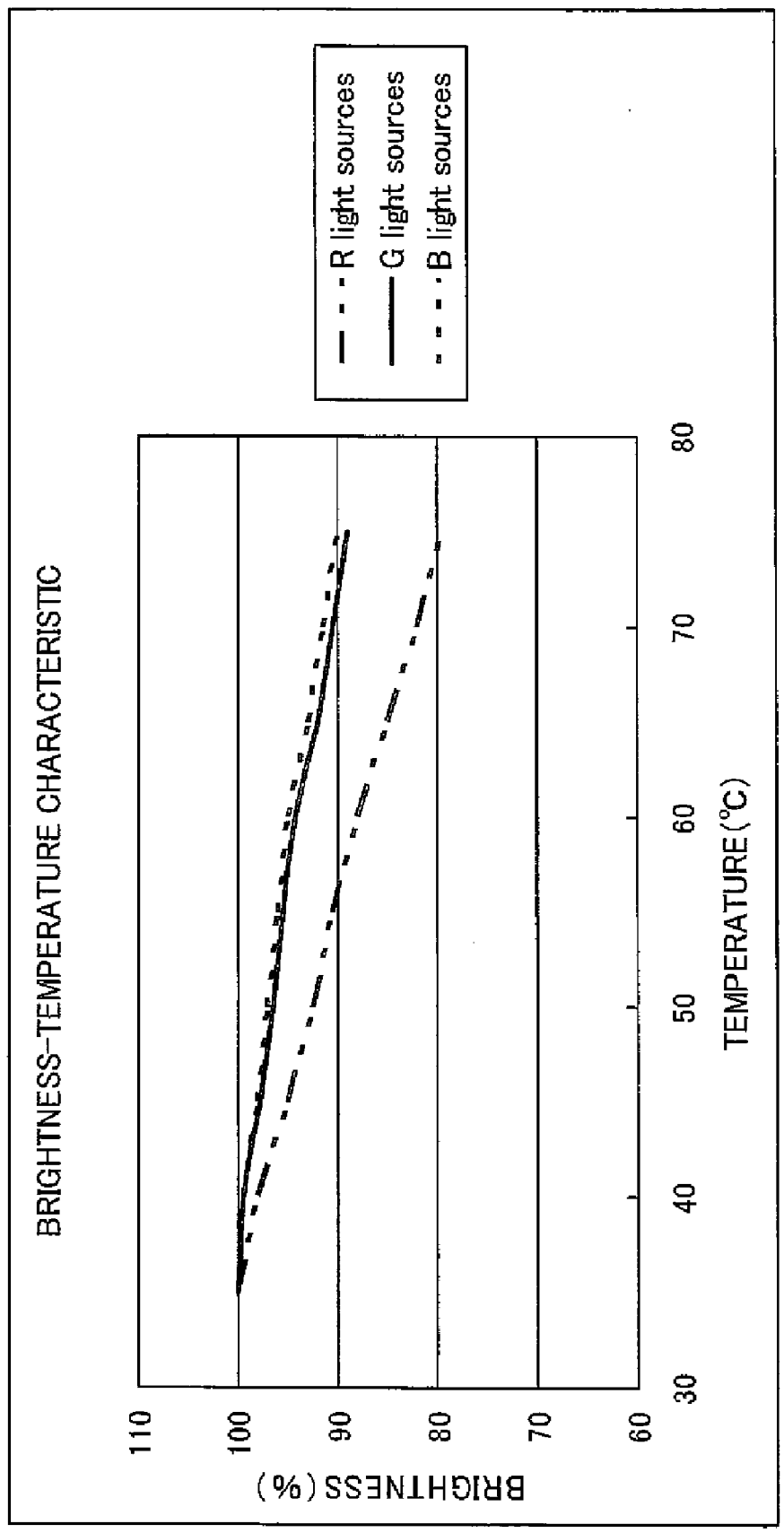
FIG. 30 is a diagram showing a brightness-temperature characteristic of an LED.
Figure 31:
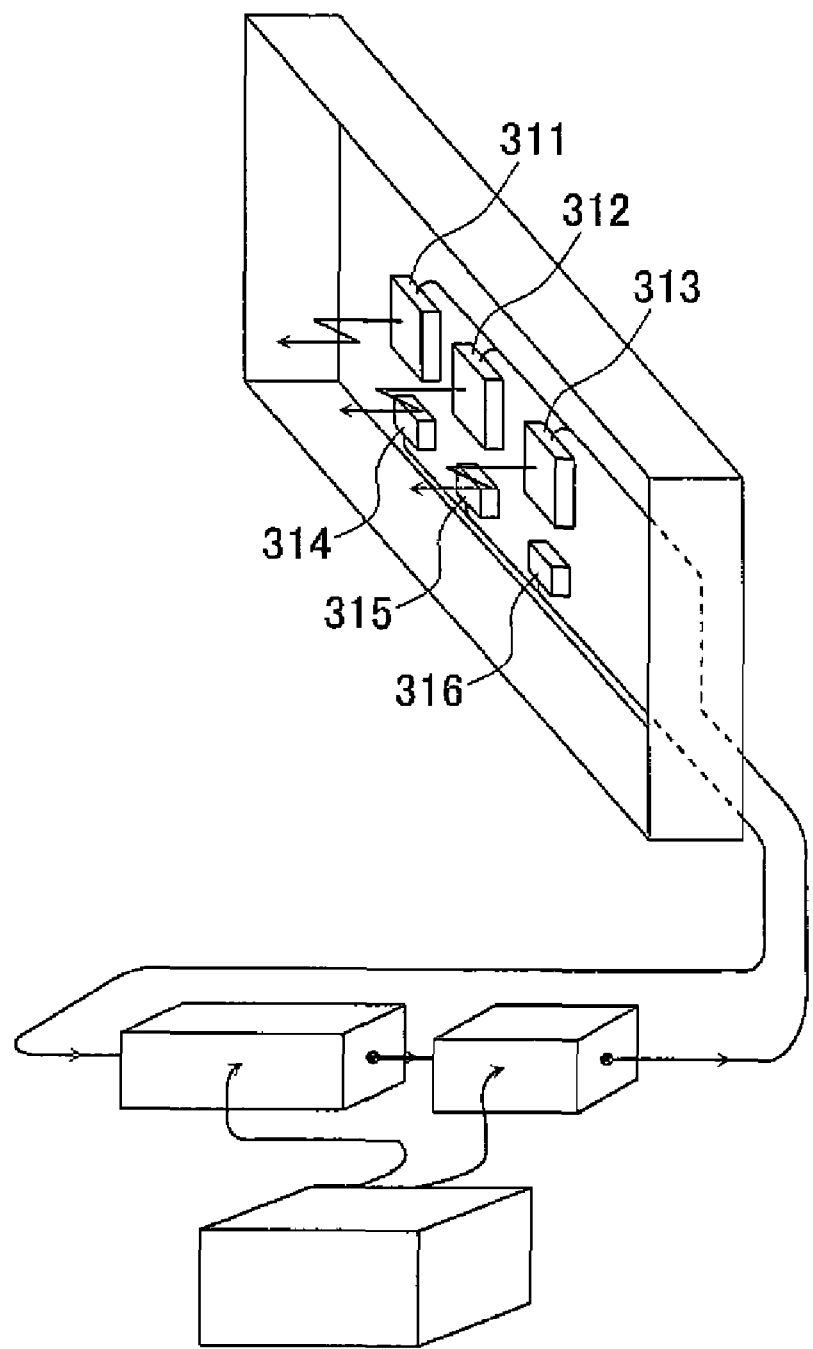
FIG. 31 is an outline view of a display device disclosed in Patent Document 1.
Figure 32A:
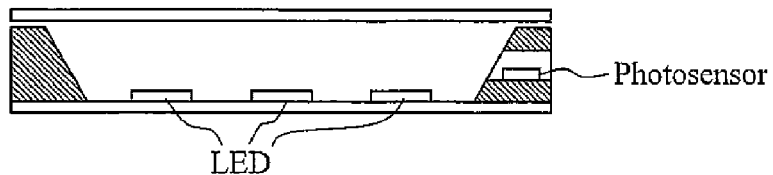
FIG. 32A is a diagram showing an arrangement location of a photosensor in Patent Document 1.
Figure 32B:
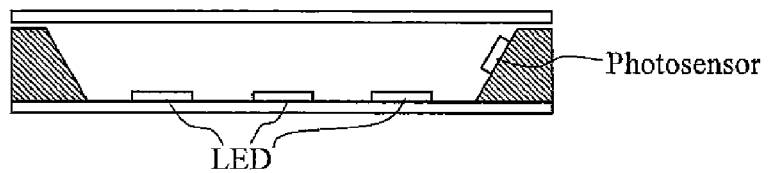
FIG. 32B is a diagram showing an arrangement location of a photosensor in Patent Document 1.
Figure 32C:
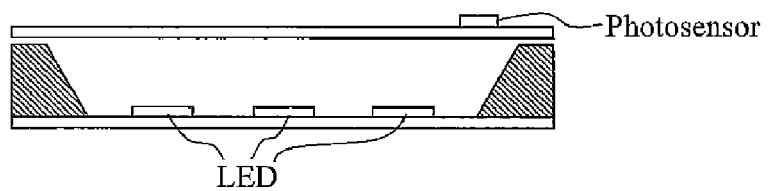
FIG. 32C is a diagram showing an arrangement location of a photosensor in Patent Document 1.
Figure 32D:
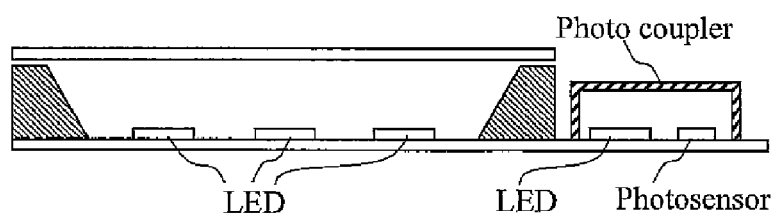
FIG. 32D is a diagram showing an arrangement location of a photosensor in Patent Document 1.
Figure 32E:
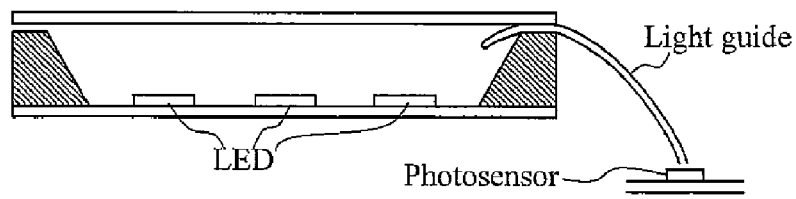
FIG. 32E is a diagram showing an arrangement location of a photosensor in Patent Document 1.
Figure 33A:
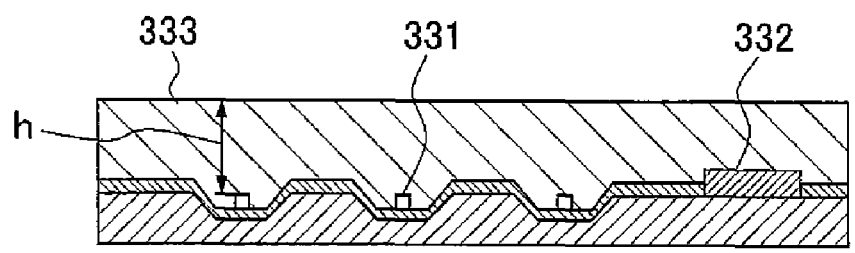
FIG. 33A is an outline view of a backlight device described in Patent Document 2.
Figure 33B:
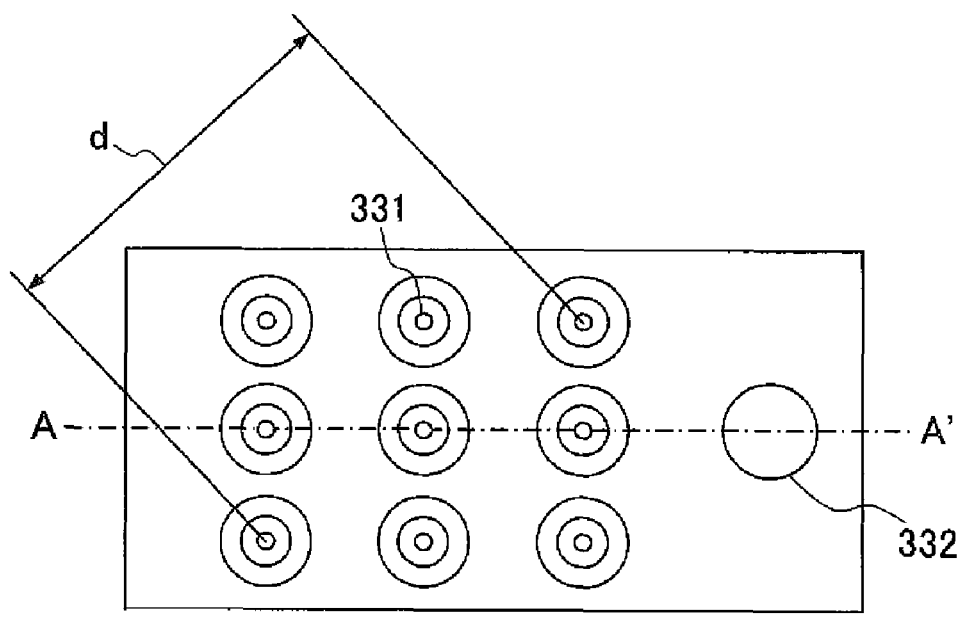
FIG. 33B is an outline view of the backlight device described in Patent Document 2.
Figure 34:
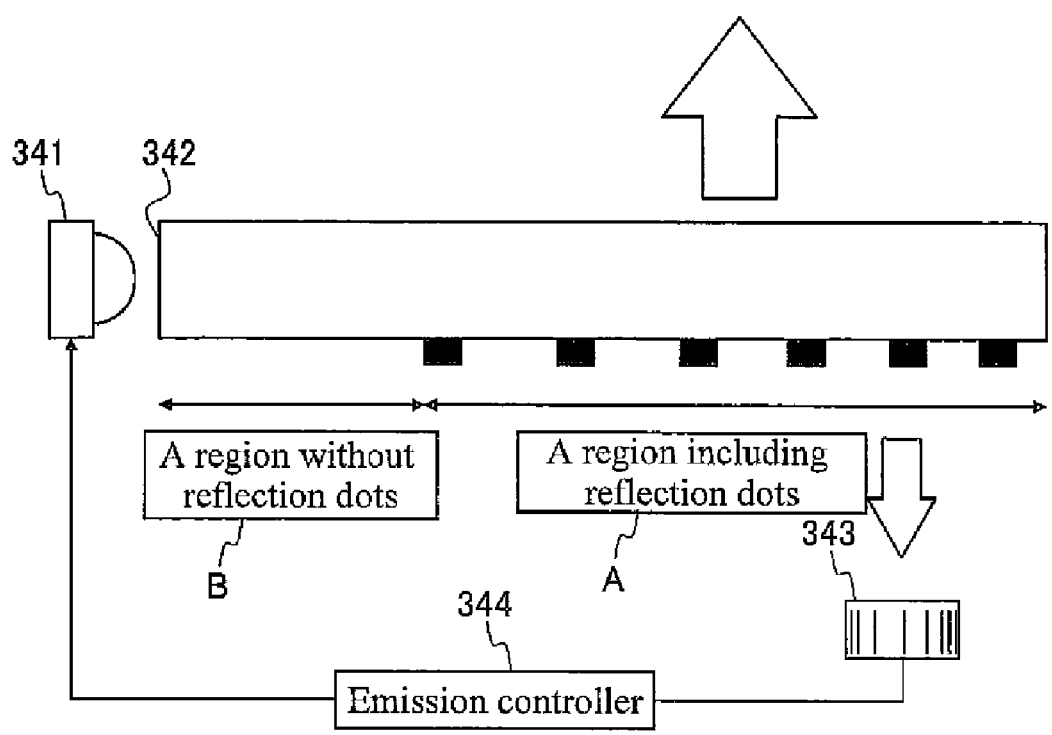
FIG. 34 is an outline view of a backlight device described in Patent Document 6.

Here, as indicated in FIG. 30, each of the LEDs is influenced by a rise in the temperature attributable to heat generated by the LEDs themselves or heat generated by a circuit component, and thus emission brightness changes. For this reason, the color balance of white is disturbed, and the white point is largely displaced. The white point is also displaced along with the elapse of time.

Accordingly, it is necessary to detect emission intensity (brightness) of each of the colors, and to perform feedback control on emission chromaticity and emission brightness to be kept to a predetermined certain emission chromaticity and emission brightness according to the detected emission intensity (brightness). Thus, a color sensor 22 is provided as a light detection means for detecting the emission intensity (emission brightness) of the light sources R, G and B. To be specific, the color sensor 22 is configured of a red sensor for detecting emission intensity of red light, a green sensor for detecting emission intensity of green light, and a blue sensor for detecting emission intensity of blue light. Additionally, the color sensor 22 is provided with color filters: a red filter for transmitting light having red-color frequency, a green filter for transmitting light having green-color frequency, a blue filter for transmitting light having blue-color frequency. The red sensor detects light having passed the red filter, the green sensor detects light having passed the green filter, and the blue sensor detects light having passed the blue filter.

Then, in the present invention, a through hole 23 penetrating the reflector 24, the light source arrangement substrate 25, and the chassis 26 is provided so that light from the light sources 1, 2 and 3 can pass through to the back surface of the chassis 26. The chassis 26 is formed in the size that can house the light sources therein. The through hole 23 is provided for the purpose of accurately detecting the above-mentioned disturbance of the color balance. The color sensor 22 is disposed in a position opposite to the light source across the reflector 24 (a side opposed to the light source arrangement side of the substrate 25 to which the light sources are arranged), and which faces the through hole 23.

The color sensor 22 disposed in such a location can detect, instead of direct light from the LEDs, indirect light that is light from the LEDs having been propagated in the backlight device for a while, and then having passed through the reflector 24, the light source arrangement substrate 25 and the like. Accordingly, it is possible to detect light of blue, green and red, mixed appropriately into white color light Moreover, the sensor 22 disposed opposite to the light source side across the reflector 24 does not interfere with light from the light source being guided to the optical member and the liquid crystal panel. Accordingly, a problem of a shadow of the color sensor 22 appearing on the liquid crystal panel can be avoided. Such a problem would be caused if the color sensor 22 were disposed closer to the light source arrangement portion than the reflector 24, thus interfering with the light guided to the liquid crystal panel.

Figure 5A:
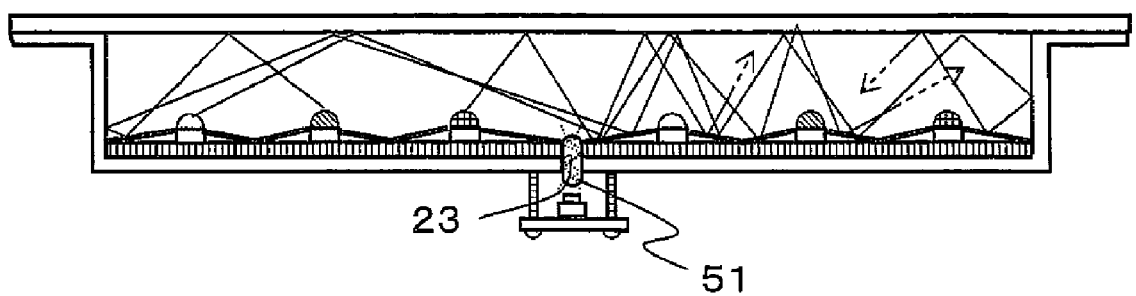
FIG. 5A is a diagram showing light mixed in the backlight device being propagated and passing through a light guiding body.
Figure 5B:
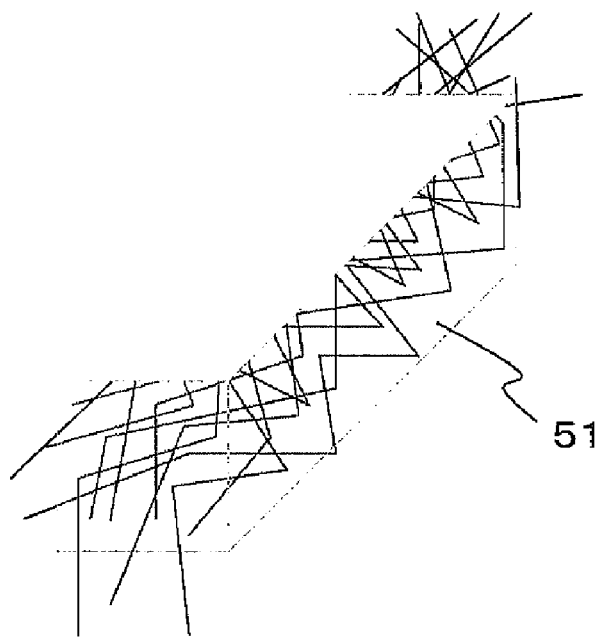
FIG. 5B is a diagram showing light mixed in the backlight device being propagated and passing through a light guiding body.

Furthermore, it is preferable that the color sensor 22 should detect light having passed through a light propagation member 51, as shown in FIG. 5B. The light propagation member 51 is a transparent color or the like and allows light to be propagated while being reflected therein and to pass through from the incident surface to the exit surface (this indicates that some light is required to be outputted from the exit surface in the end). This is because multiple kinds (such as colors) of light beams are mixed by being reflected repeatedly while being propagated in the light propagation member 51, and light of blue, green and red in a mixed white light can be detected.

Figure 6A:
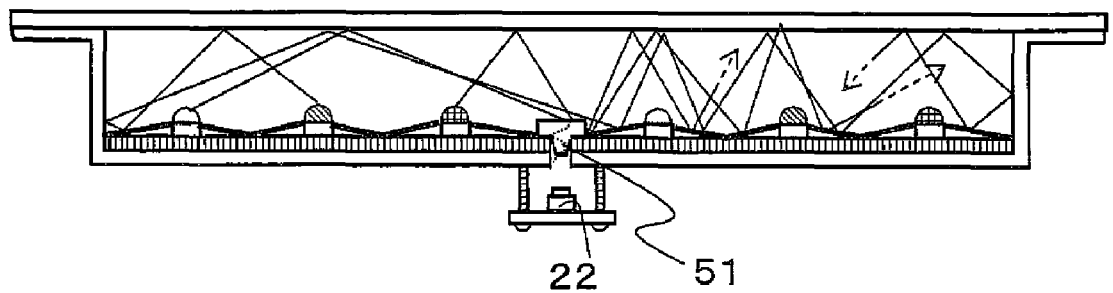
FIG. 6A is an outline view exemplifying a case where a light guiding body having a convex portion is fitted to a through hole.
Figure 6B:
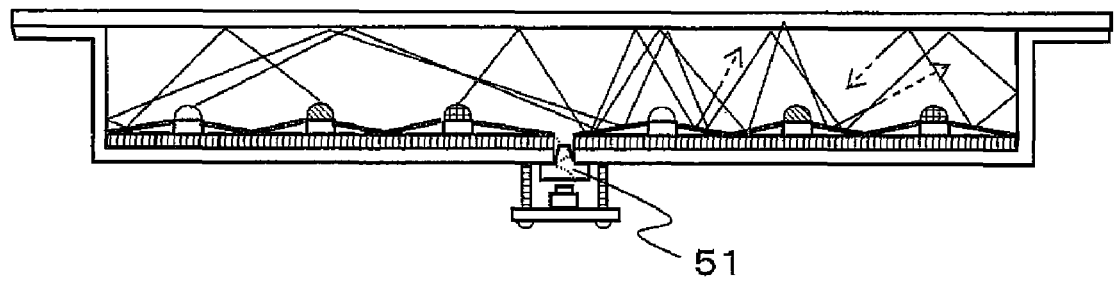
FIG. 6B is an outline view exemplifying a case where a light guiding body having a convex portion is fitted to a through hole.

What is important here is to provide the light propagation member 51 to the through hole 23. So, the light propagation member 51 of a convex shape, for example, may be fitted to the through hole 23 so as to block the through hole 23. For example, in FIG. 6A, a light propagation member 51 having a convex portion is fitted to the through hole from above. This configuration is effective in that the convex portion serves as a light guiding means so that mixed light can be efficiently guided to the sensor 22. Needless to say, the light propagation member 51 may alternatively be fitted to the through hole from below, as shown in FIG. 6B. In addition, a configuration may be employed in which the convex portion inserted from one end penetrates the through hole to the other end.

Additionally, dots may be formed on a side surface of the light propagation member 51 so as to have a diffusion function in addition to the reflection function.

In the present embodiment, the light propagation member 51 is used as a light guiding body. As denoted by reference numeral 21 in FIGS. 2A and 2B, the light guiding body protrudes to the light source arrangement side of the reflector 24, while an engaging portion 32 (FIG. 3) of the light guiding body also slightly protrudes to the side opposed to the light source arrangement side of the back surface of the chassis 26. The engaging portion 32 is engaged to the through hole at the back of the chassis 26.

Since the light guiding body 21 is formed to protrude to the light source arrangement side of the reflector 24, the light guiding body 21 can appropriately collect both brightness of LEDs near the light guiding body 21, and brightness of LEDs away from the light guiding body 21. In other words, the light guiding body 21 of the present invention functions as a light collection means as well as a light guiding means guiding light to the sensor 22. Here, the light is emitted from the light source, is propagated through the light guiding body, and then passes through to the opposite side to the light source side of the reflector 24.

Figure 3:
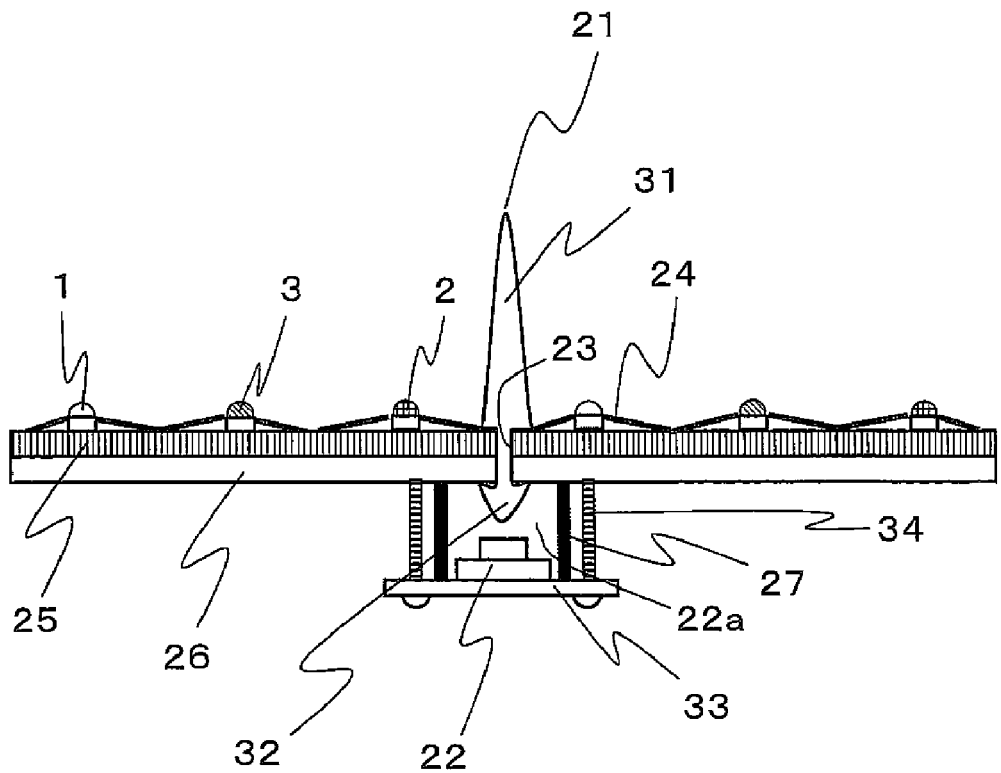
FIG. 3 is a diagram showing a configuration of a light guiding body and a periphery thereof in the first embodiment of the present invention.
Figure 4:
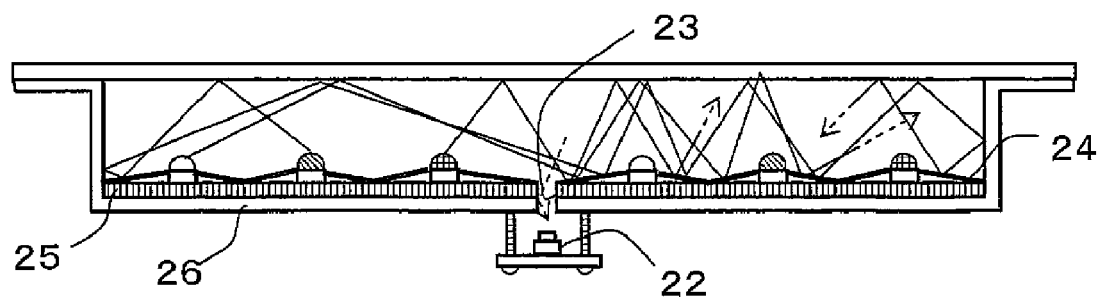
FIG. 4 is a diagram showing light mixed in the backlight device passing through a through hole.

FIG. 3 shows a detailed configuration of the light guiding body 21 and a periphery thereof. The light guiding body 21 is formed in a protruding shape and has the engaging portion 32 such that the protruding portion 31 can be stood on the light source arrangement substrate 25, or the like. The light guiding body 21 is stood on the light source arrangement substrate 25 by fitting the engaging portion 32 to a through hole penetrating the reflector 24, the light source arrangement substrate 25, and the chassis 26.

Moreover, in order to guide appropriately mixed light to the sensor 22, the light guiding body 21 is formed of transparent acrylic, optical fiber or the like. Although accordingly the mixed light passes through to the back of the reflector 24 and the like, the light also passes through holes for heat release and the like provided to the cabinet of the backlight device. Hence, in a case of applying the present invention to a liquid crystal display device, there is a drawback that light of the backlight leaks from the holes for heat release and the like provided to the cabinet at the back of the display device. This leakage of the backlight from the back of the cabinet during display of an image leads to degradation of quality of the display device.

In order to prevent this leakage, a light shielding wall 27 is provided on a sensor substrate 33 on which the sensor 22 is mounted so that the light shielding wall 27 can surround the sensor 22. In this way, a sensor housing room for housing the sensor 22 is formed by the sensor substrate 33 and the light shielding wall 27, thereby preventing light guided by the light guiding body 21 to the sensor 22 from passing any further than the sensor housing room 22a (the opposite side to the sensor 22 arrangement side of the sensor substrate 33). Here, note that reference numeral 34 denotes a screw and a boss for attaching the sensor substrate 33.

In the backlight device configured in the above-mentioned manner, the white light as a result of mixture of the light emitted from the LEDs 1, 2 and 3 being light sources is collected by the protruding portion 31 of the light guiding body 21, is guided to the back of the light source arrangement substrate 25 after being propagated in the light guiding body 21, and then detected by the sensor 22. The thus-detected emission intensities of the respective LEDs 1, 2 and 3 of red, green and blue are compared with predetermined reference values, and the emission intensity is adjusted by performing feedback to each of the LEDs 1, 2 and 3 such that the difference between the detected value and the reference value becomes zero. Thus, chromaticity of the mixed light can be maintained at a certain level.

Incidentally, height of the protruding portion 31 of the light guiding body 21 should preferably be higher than the light source. This configuration enables the light guiding body 21 to appropriately collect light from a distant light source, and moreover, prevents occurrence of irregularity in brightness on the image display surface, by preventing the optical member disposed on the front surface of the chassis 16 from bending to the light source side and contacting the light source.

Meanwhile, with respect to preventing the bending of the optical member, one or more projections 71 for preventing the bending of the optical member may be provided in addition to the light guiding body 21, as shown in FIGS. 7A and 7B. Although the reflector 24 is formed without the tilt in FIGS. 7A and 7B, any kind of the reflectors may be used for implementing the present invention.

Needless to say, a configuration may be employed of increasing the number of light guiding bodies 21 instead of providing the projections 71. The number of color sensors 22 may also be increased along with the number of light guiding bodies 21, for a configuration enabling a more secure correction of chromaticity deviation. Note that specific configurations for increasing the number of light guiding bodies will be described in the examples below.

Second Embodiment

Figure 8:
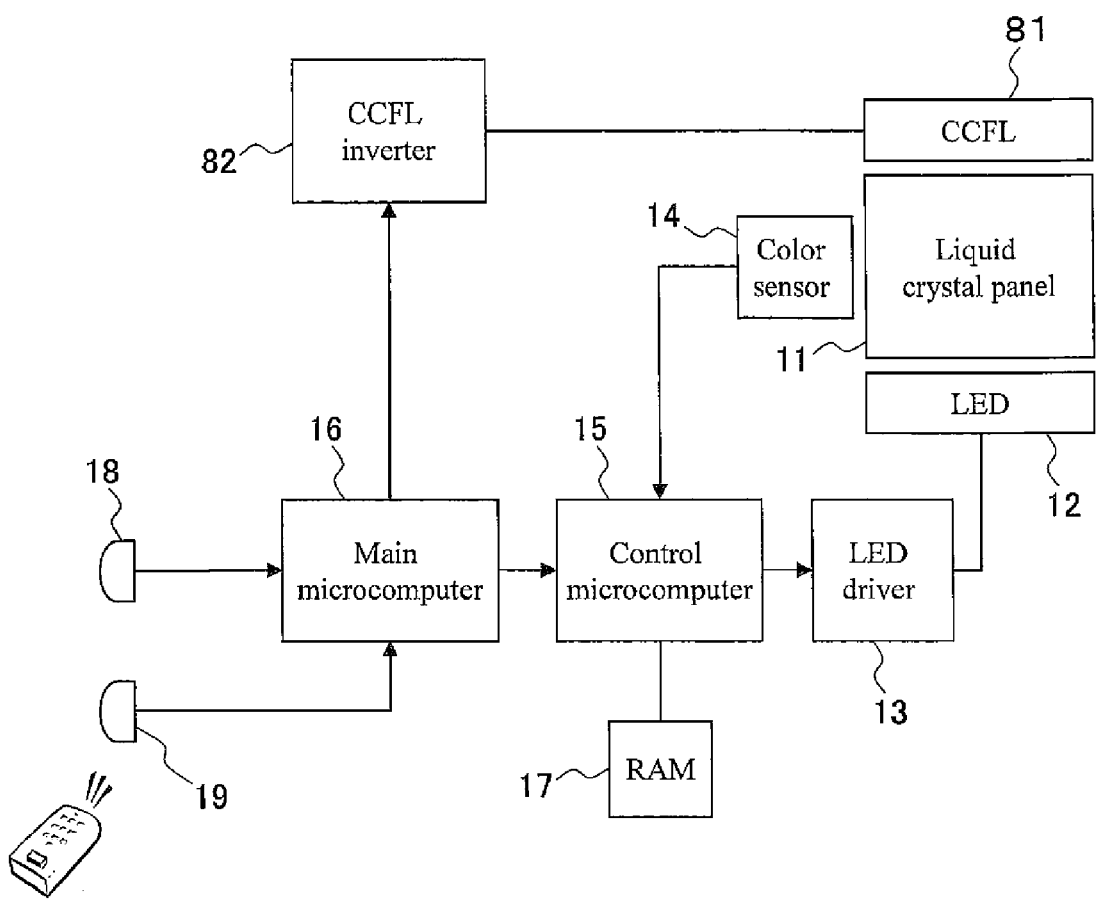
FIG. 8 is a block diagram showing a liquid crystal display device of a second embodiment of the present invention.

FIG. 8 shows a block diagram of a liquid crystal display device of the present embodiment. The present embodiment is different from the first embodiment in that the LEDs 12 emit light of a single color instead of emitting light of a plurality of colors, and that the liquid crystal display device includes, as light sources, not only the LEDs but also fluorescent lamps (CCFLs) 81 and a CCFL inverter 82 that drives the CCFLs 81.

FIGS. 9A and 9B show a backlight device serving as an illumination device obtained by removing a liquid crystal panel and an optical member from the liquid crystal display device. FIG. 9B is a view showing the backlight device seen from the front (front view), and FIG. 9A is a view showing the backlight device seen from the side along a dashed line A in FIG. 9B (sectional view).

The backlight device is a so-called direct type backlight device in which a plurality of fluorescent lamps 4 are arranged so that longitudinal directions thereof are set in approximately the same, and light beams from the fluorescent lamps are emitted to a liquid crystal panel.

Additionally, the backlight device includes, between the fluorescent lamps, a plurality of LEDs 5 that emit red light, in order to broaden the color reproducibility as compared to a case of expressing an image with only light from the fluorescent lamps 4.

Here, since brightness of the LEDs 5 are apt to change in accordance with the temperature, as indicated in FIG. 30, chromaticity of the light guided to the liquid crystal panel is deviated. For correcting such a deviation in chromaticity, a color sensor 22 is provided as similar to the first embodiment, to the side opposite to the light source arrangement side of a light source arrangement substrate 25 in a position facing a through hole of the light source arrangement substrate 15. The reason for providing the color sensor 22 in such a position is the same as that in the first embodiment.

Moreover, the backlight device serving as an illumination device according to the present invention includes a plurality of fluorescent lamps 4 as light sources, and the tube form of each of the fluorescent lamps tend to become thinner and longer, so as to adapt to the liquid crystal display devices that are becoming thinner and larger in size. Accordingly, the fluorescent lamps 4 may bend in some cases, and may be destroyed by heat generated either by the fluorescent lamps themselves or by the heating of the circuit components. For this reason, in addition to supports disposed near both ends of the fluorescent lamps 4, the backlight device is provided with lamp holders 92 for preventing the fluorescent lamps 4 from moving between the supports.

Although the lamp holder may be configured such that a single lamp holder holds a single fluorescent lamp, the lamp holder 92 of the present embodiment is configured to hold a plurality of fluorescent lamps 4 at predetermined intervals by integrally forming a base substrate 101 and a plurality of holding portions 102 provide thereon. Furthermore, a projection that projects higher than a fluorescent lamp is provided between the holding portions so that an optical member such as a diffuser cannot bend.

In the first embodiment, the light guiding body 21 functions as a light guiding means, a light collecting means, and prevention of bending of the optical member. In addition to these functions, a light guiding body 91 according to the present embodiment includes the base substance 101 and the holding portions 102 as similar to the form of the above-mentioned lamp holder, to fulfill the function of holding the fluorescent lamps and keeping the fluorescent lamps in places at predetermined intervals.

FIG. 10 shows a detailed diagram of a configuration of the light guiding body 91 and a periphery thereof. The light guiding body 91 has a projection protruding portion 31 and a locking portion 32 as similar to the light guiding body 21 of the first embodiment, and additionally has a plurality of holding portions 102 (two holding portions 102 are included in the drawing) integrally formed with the base substance 101. In order to fulfill the function as a light guiding means, the light guiding body 91 is formed of a material through which light can pass, such as transparent acrylic or optical fiber.

Then, as similar to the first embodiment, a sensor housing room is formed by a light shielding body 27 and a sensor substrate 33, for a configuration in which light beams from the light sources 4 and 5 do not leak outside the cabinet.

Meanwhile, although the lamp holder 92 is attached by inserting and fitting a locking means as similar to the engaging portion 32 of the light guiding body 81 to a through hole, a material and a color of the lamp holder 92 are those that does not allow light to pass through. The lamp holder 92 is formed of such a material and a color in order to prevent the light from the light sources 4 and 5 from leaking outside the cabinet.

In the backlight device configured in the above-mentioned manner, the mixed light as a result of mixture of the light emitted from the fluorescent lamps 4 and the LEDs 5 being light sources is collected by the protruding portion 31 of the light guiding body 91. Thereafter, the mixed light is guided to the back of the light source arrangement substrate 25 after being propagated in the light guiding body, and then detected by the sensor 22. The thus-detected emission intensity of the light from the LEDs 5 is compared with a predetermined reference value, and the emission intensity is adjusted by performing feedback to the LEDs 5. The sensor 22 is configured of a red sensor, a green sensor and a blue sensor in the same manner as that in the first embodiment.

Figure 11:
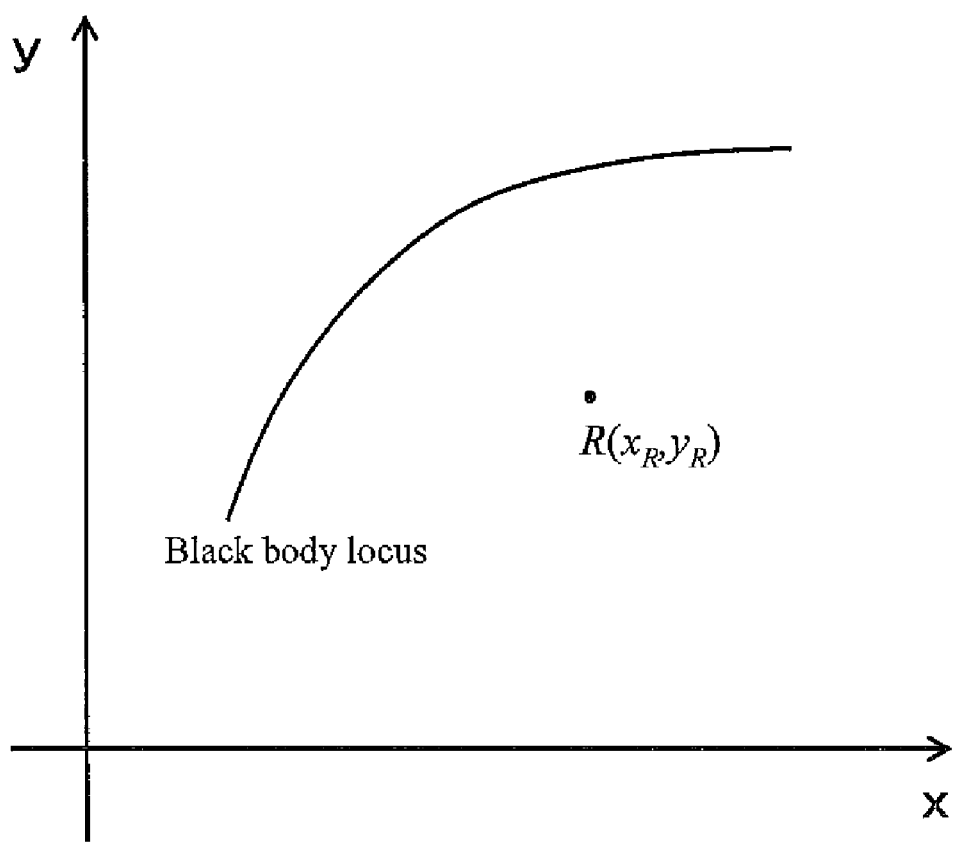
FIG. 11 is a diagram showing a black body locus in a chromaticity diagram.

As a specific method for adjusting emission intensity of the LEDs 5, firstly, the black body locus as shown in FIG. 11 may be drawn in a chromaticity diagram. The black body locus is a state where the color of the black body varies with the absolute temperature. In a case where a chromaticity coordinate is on the black body locus, a state is indicated where there is no deviation in white chromaticity. A point R in FIG. 11 denotes a chromaticity coordinate of an R light source 5 in a normal emitting state.

Figure 12A:
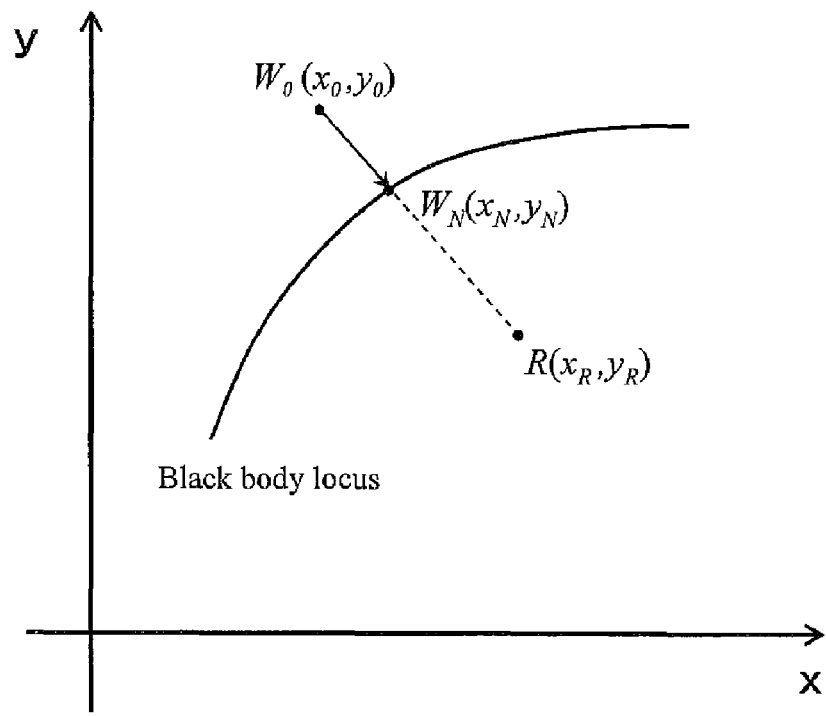
FIG. 12A is a diagram showing a concept of correcting a current chromaticity point to a black body locus in a chromaticity diagram.
Figure 12B:
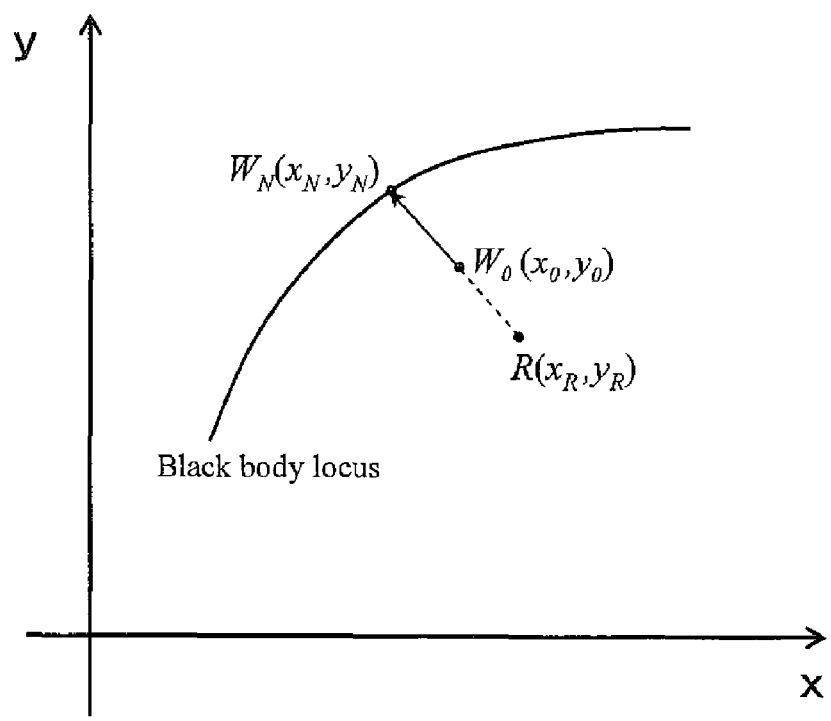
FIG. 12B is a diagram showing the concept of correcting a current chromaticity point to a black body locus in a chromaticity diagram.

The method for adjusting emission intensity will be explained by use of conceptual diagrams of FIGS. 12A and 12B. Firstly, initialization is performed, and then the color sensor 14 calculates a chromaticity coordinate $W_0(x_0, y_0)$ on the chromaticity diagram. Thereafter, the color sensor 14 calculates an intersection point $W_N$ of the black body locus and a line joining the current chromaticity coordinate $W_0$ and the chromaticity coordinate point R of the red LED, and performs correction for a distance from $W_0$ to $W_N$. As for the correction direction, correction is made to reduce emission brightness of the R light source 5 if $W_0$ is above the black body locus, and correction is made to enhance emission brightness of the R light source 5 if $W_0$ is below the black body locus. Emission intensity of the R light sources is changed by changing the current value or by changing the duty ratio. Hence, chromaticity of the mixed light can be maintained at a certain level.

Figure 13A:
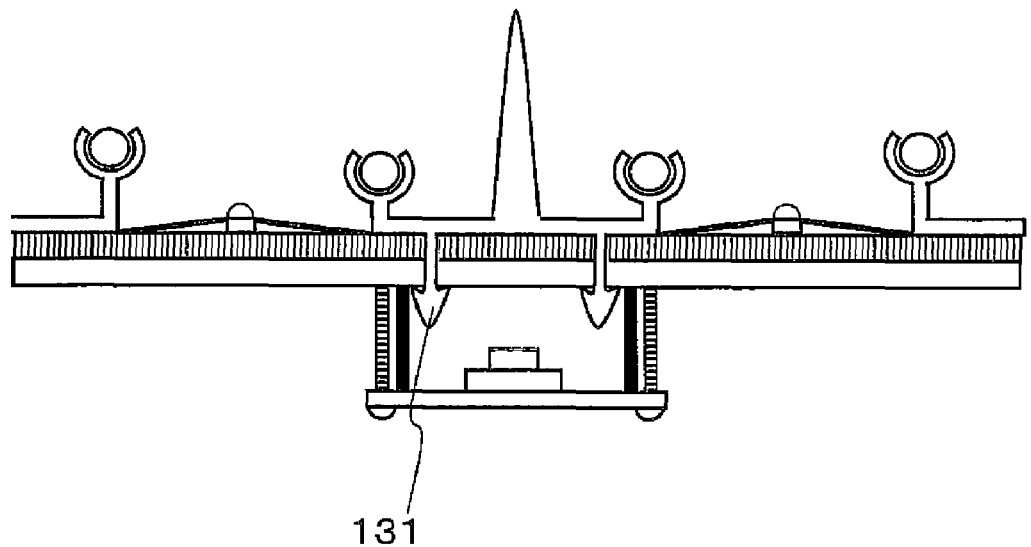
FIG. 13A is a diagram showing another configuration of a light guiding body and a periphery thereof in the second embodiment of the present invention.
Figure 13B:
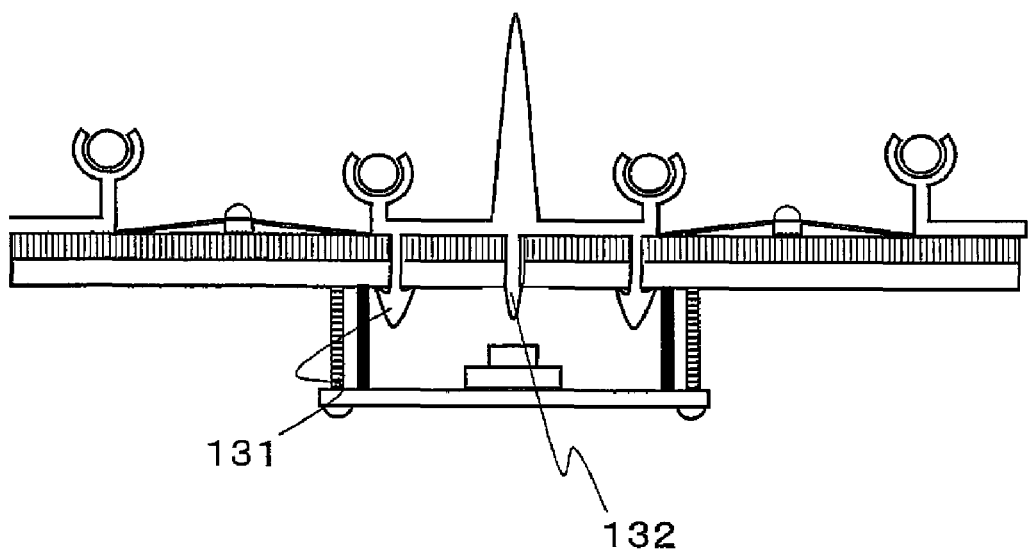
FIG. 13B is a diagram showing another configuration of a light guiding body and a periphery thereof in the second embodiment of the present invention.

Incidentally, although a configuration has been shown in which the light guiding body 91 according to the present embodiment has a single locking portion 32 which also serves as light guiding means as in FIG. 10, a configuration may be employed where the light guiding body 91 has a plurality of locking portions 131 or where the light guiding body 91 further has a convex portion 132 as shown in FIGS. 13A and 13B. In this configuration, the light guiding body has a plurality of locking portions, the light guiding body does not rotate in the attached state, and stability thereof is improved.

This configuration including a plurality of locking portions 131 may also be employed in the light guiding body 21 of the first embodiment (the configuration where the light guiding body 21 has a base substrate and a plurality of locking portions).

Although a case of red LEDs being the light sources has been shown in the present embodiment, the invention is not limited to this, and the LEDs may be another color or a plurality of colors.

In the first and second embodiments, from the viewpoint that chromaticity of the center portion of the screen should be adjusted, examples have been shown where the light guiding bodies 21 and 91 are disposed in the center of the backlight device when viewed from the front. However, the location to dispose the light guiding bodies 21, 91 and the sensor is not limited to this. For example, a configuration may be possibly employed where the light guiding bodies 21, 91 and the sensor are disposed in a location other than the center, in accordance with modifications in the configuration and arrangement of the light sources. In the configuration where the light guiding bodies 21, 91 and the sensor are located in the center of the screen, chromaticity of the center of the screen can be adjusted most easily.

Third Embodiment

Figure 15:
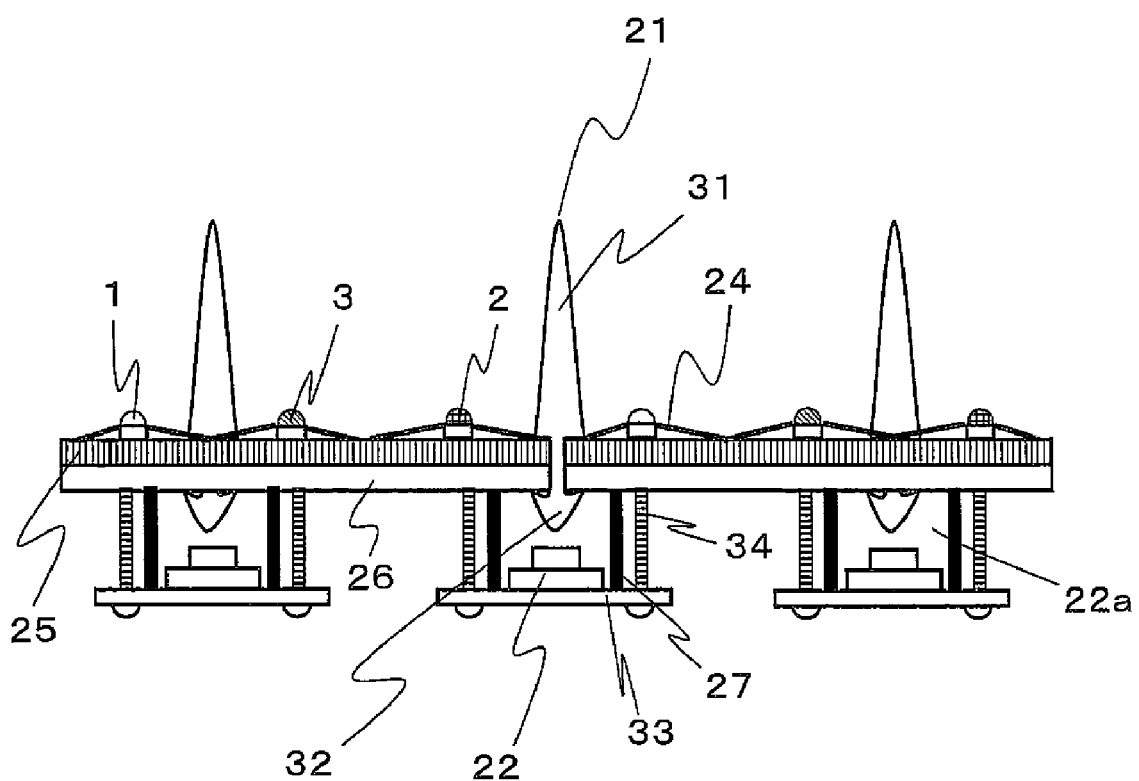
FIG. 15 is a diagram showing a configuration of light guiding bodies and a periphery thereof in the third embodiment of the present invention.

A description will be given for a backlight device serving as an illumination device according to a third embodiment with reference to FIGS. 14A, 14B and 15.

FIGS. 14A and 14B show a backlight device serving as an illumination device obtained by removing a liquid crystal panel and an optical member from the liquid crystal display device. FIG. 14B is a view showing the backlight device seen from the front (front view), and FIG. 14A is a view showing the backlight device seen from the side along a dashed line A in FIG. 14B (sectional view).

As similar to the first embodiment, the present embodiment employs a configuration in which a plurality of color sensors 22 are provided on the opposite side to the light source side across the reflector 24. Along with these sensors, provided are a plurality of light guiding bodies 21, and a plurality of sensor housing rooms 22a each formed by a sensor arrangement substrate 33 and a light shielding wall 34.

With such a configuration, in the light collected by each of the light guiding bodies 21, emission intensity of the LEDs 1, 2 and 3 of red, green and blue in the control range of each of the sensors 22 is compared with predetermined reference values, respectively. Then, the emission intensity is adjusted by performing feedback to each of the LEDs 1, 2 and 3 such that the difference between the detected value and the reference value becomes zero.

By increasing the number of sensors 22 as described above, an LED that does not emit light can be detected, and a deviation in chromaticity due to a difference in the temperature between the upper and lower portions of a panel can be checked for every divided portion. Accordingly, a uniform chromaticity can be obtained even when the screen is enormous in size.

Fourth Embodiment

Figure 17:
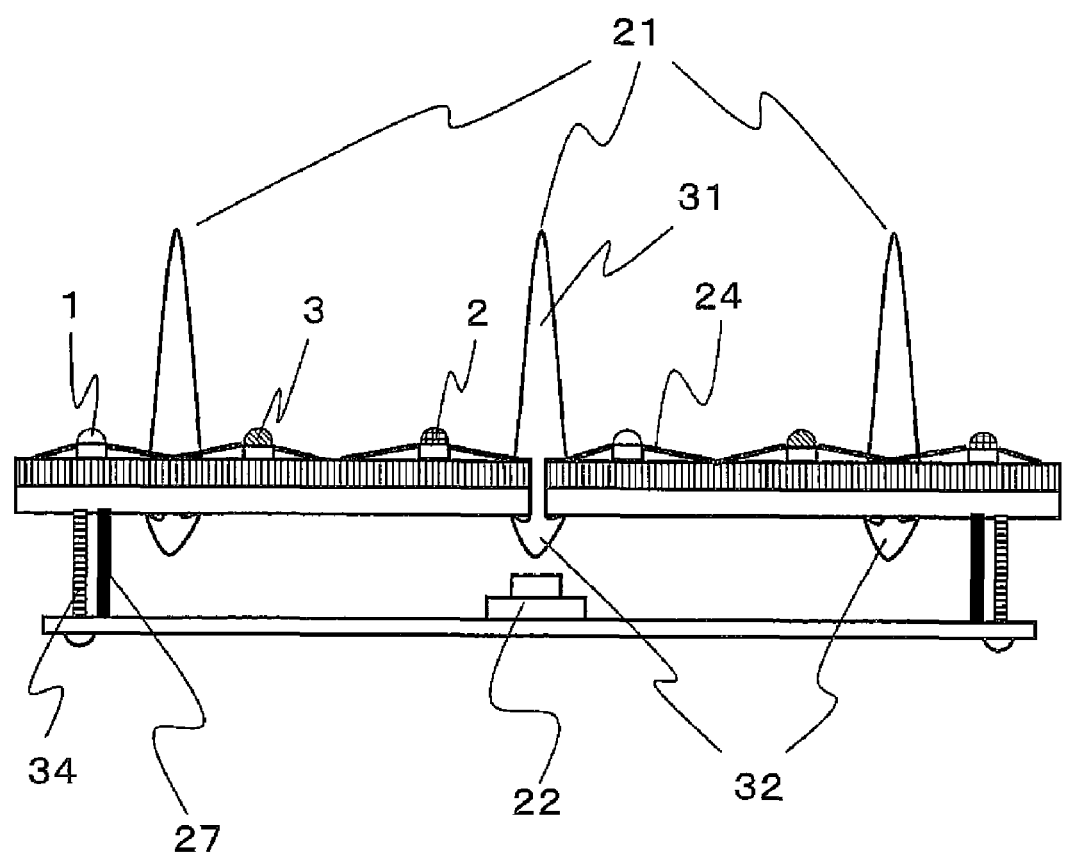
FIG. 17 is a diagram showing a configuration of light guiding bodies and a periphery thereof in the fourth embodiment of the present invention.

A description will be given for a backlight device serving as an illumination device according to a fourth embodiment with reference to FIGS. 16A, 16B and 17.

FIGS. 16A and 16B show a backlight device serving as an illumination device obtained by removing a liquid crystal panel and an optical member from the liquid crystal display device. FIG. 16B is a view showing the backlight device seen from the front (front view), and FIG. 16A is a view showing the backlight device seen from the side along a dashed line A in FIG. 16B (sectional view).

In the present embodiment, while the number of sensors 22 provided to the opposite side to the light source side across the reflector 24 is kept as small as possible, the number of light guiding bodies 21 is increased. Then, a sensor housing room is formed in a size that can cover the arrangement area of the plurality of light guiding bodies 21.

With this configuration, the degree of mixture of the colors can be detected evenly in all the divided regions of the screen, since the light guiding bodies 21 are provided in a plurality of locations. Additionally, since the whole arrangement area of the plurality of light guiding bodies 21 is covered by the sensor room, light having passed through to the back of the chassis (opposite of the light source arrangement side) after being transmitted through the through holes by the light guiding bodies, does not leak outside the cabinet.

Figure 18:
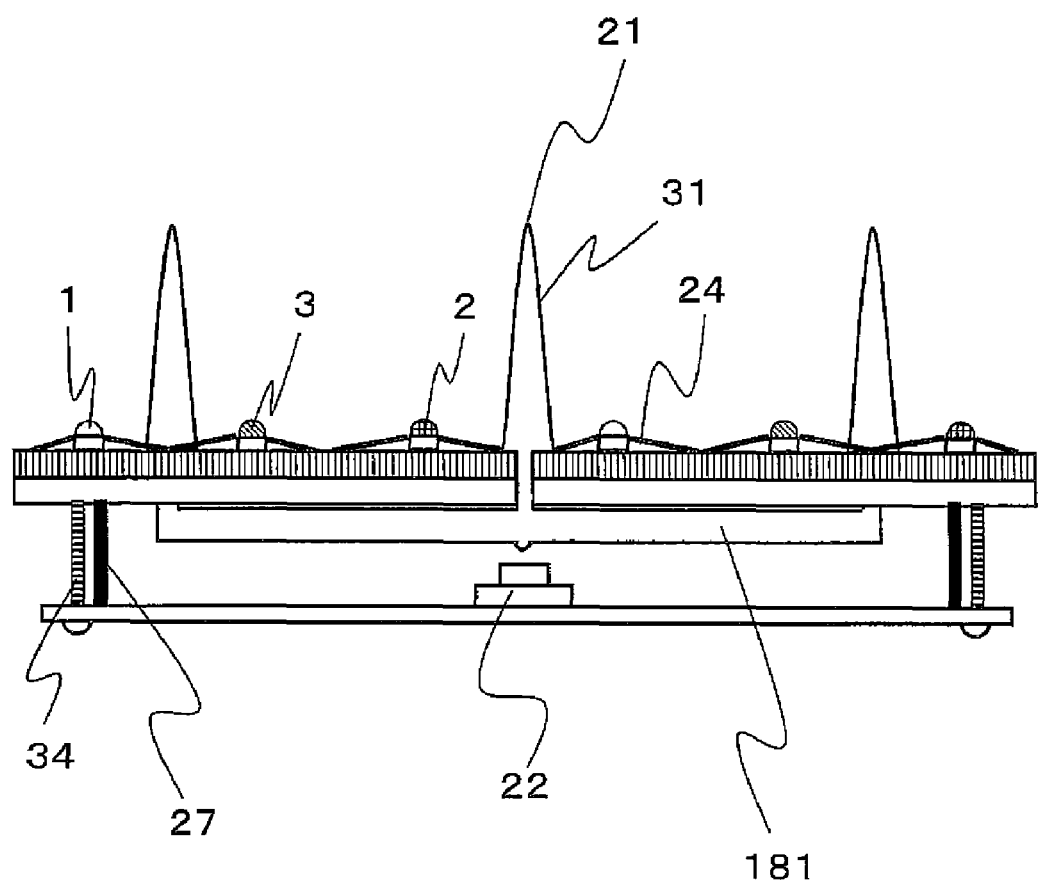
FIG. 18 is a diagram showing a configuration of a light guiding body and a periphery thereof in a modified example of the fourth embodiment of the present invention.

Incidentally, in order to reliably guide light from all the light guiding bodies 21 to concentrate to the sensor 22, a back-surface light guiding body 181 (FIG. 18) may be provided to the back of the chassis (opposite of the light source side of the reflector 24) in order to guide light from all the light guiding bodies 21 to the sensor 22. This configuration allows light from all the light guiding bodies 21 to be guided to the sensor 22 while being propagated. Thus, loss in the light amount is reduced, allowing an accurate detection of mixed light. This back-surface light guiding body 181 may be in the form of a plate, a bar, or in a curved form, as long as a path to the sensor 22 is secured.

In addition, the back-surface light guiding body 181 need neither be connected with all the plurality of light guiding bodies 21, nor be provided for every one of the light guiding bodies 21. Moreover, the back-surface light guiding body 181 does not necessarily have to be connected to the light guiding bodies 21 either, and may be provided directly to the back end of a through hole to which no light guiding body is provided, for example.

A configuration may also be employed in which a plurality of sensors 22 of the present embodiment are provided.

Fifth Embodiment

Figure 20:
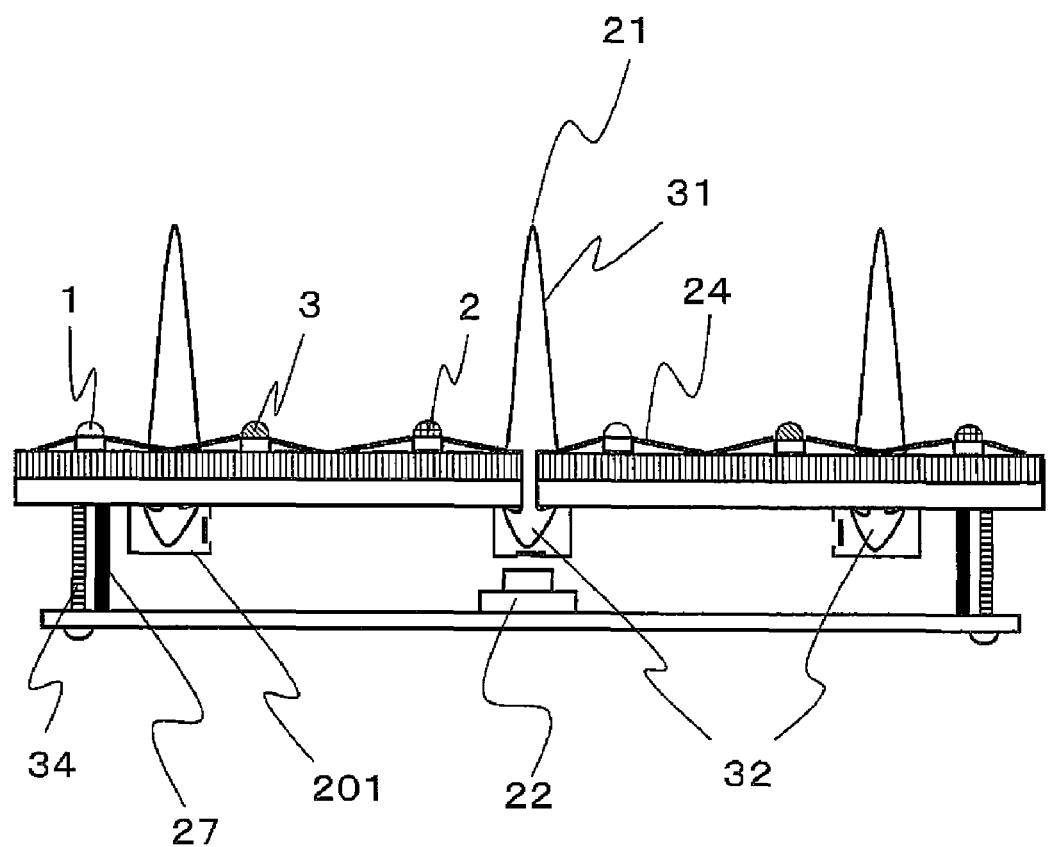
FIG. 20 is a diagram showing a configuration of light guiding bodies and a periphery thereof in the fifth embodiment of the present invention.

A description will be given for a backlight device serving as an illumination device according to a fifth embodiment with reference to FIGS. 19A, 19B and 20.

FIG. 19 shows a backlight device serving as an illumination device obtained by removing a liquid crystal panel and an optical member from the liquid crystal display device. FIG. 19B is a view showing the backlight device seen from the front (front view), and FIG. 19A is a view showing the backlight device seen from the side along a dashed line A in FIG. 19B (sectional view).

In the present embodiment, a shutter 201 (opening and closing means) is provided on the course of light guided from each of the light guiding bodies 21 to the sensor 22 in the opposite side to the light source side across the reflector 24, in addition to the configuration of the fourth embodiment. By controlling the opening and closing of the plurality of shutters in chronological order, only light from a certain light guiding body is allowed to pass through.

In such a configuration, a single sensor can appropriately detect light of all the mixed colors collected respectively by light guiding bodies 21 in divided regions. This is made possible by performing control so that only a single shutter among the plurality of shutters is opened at a time. Thereafter, for every divided region, the emission intensity of the LEDs 1, 2 and 3 of red, green and blue is compared with a corresponding predetermined reference value, and the emission intensity is then adjusted by performing feedback to each of the LEDs 1, 2 and 3 such that the difference between the detected value and the reference value becomes zero.

The above-mentioned shutter 201 does not necessarily control whether or not to allow light having been transmitted through the light guiding body 21 to pass through to the sensor 22, but may control whether or not to allow light which has not been transmitted through the light guiding body 21 and merely passed through a simple through hole, to pass through to the sensor.

Figure 21:
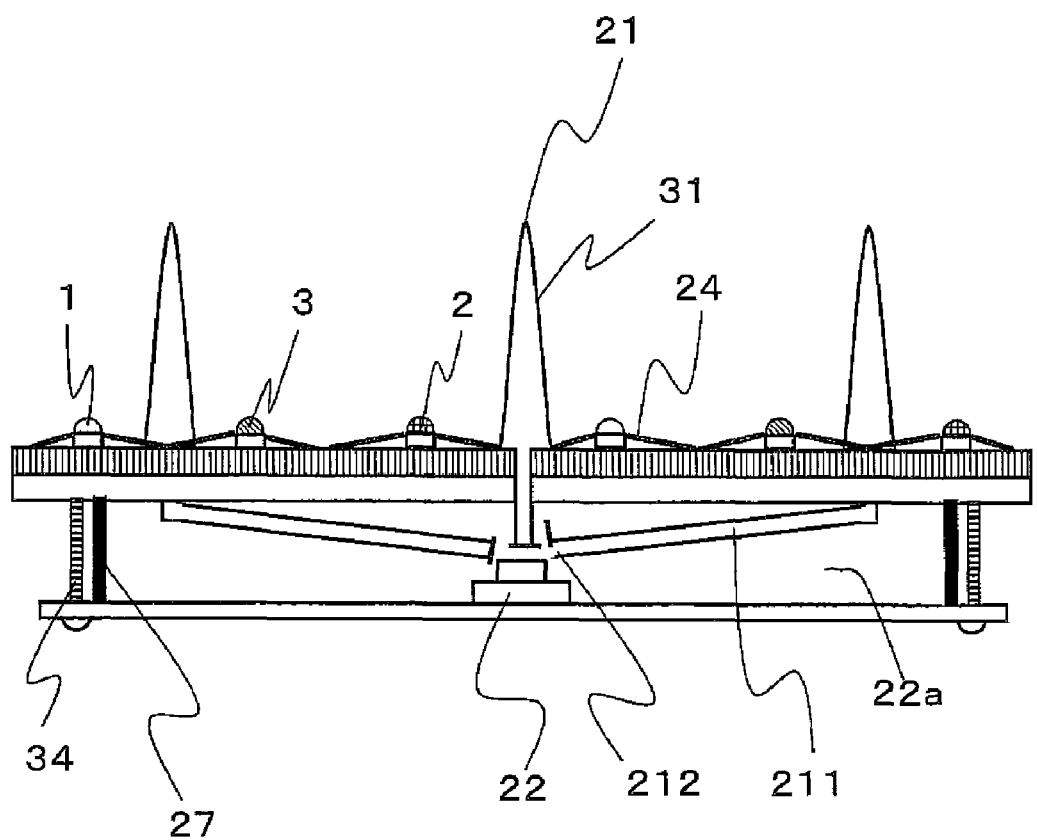
FIG. 21 is a diagram showing a configuration of a light guiding bodies and a periphery thereof in a modified example of the fifth embodiment of the present invention.

In addition, as in FIG. 21, a configuration may be employed as similar to the modified example of the fourth embodiment, in which a back-surface light guiding body 211 is provided in a sensor housing room 22a for making it easier to guide light to the sensor 22. A shutter 212 may also be provided in any location on the course of light guided from each of the light guiding bodies 21 to the sensor 22.

Sixth Embodiment

A description will be given for a backlight device serving as an illumination device according to a sixth embodiment with reference to FIG. 22.

The sensor 22 in each of the above embodiments is provided with color filters, and configured of a red sensor detecting light having passed through a red filter, a green sensor transmitting light having passed through a green filter, and a blue sensor detecting light having passed through a blue filter. However, in the present embodiment, a configuration is employed in which each of the light guiding bodies 21 is caused to serve as the above-mentioned filters, so that the sensor 22 does not require color filters.

Figure 22:
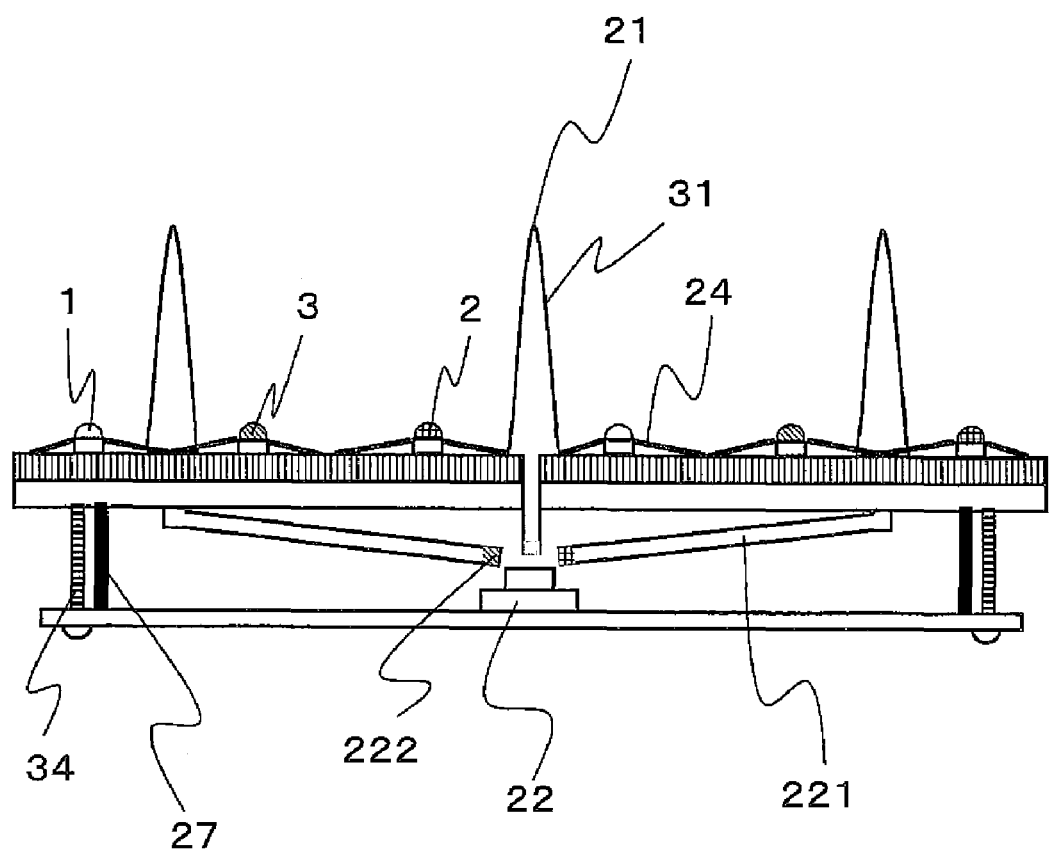
FIG. 22 is a diagram showing a configuration of light guiding bodies and a periphery thereof in a modified example of a sixth embodiment of the present invention.

In FIG. 22, an example is shown of a configuration similar to the modified example of the fourth embodiment, where each light guiding body 21 is provided with a back-surface light guiding body 221. Here, a transmission-wavelength selecting means 222 such as different color filters and the like are provided to a part immediately before where the light from the back-surface light guiding body 221 enters the sensor 22, detecting emission brightness of each color. The location of the transmission-wavelength selecting means 222 is not limited to the part immediately before where the light enters the sensor 22, and may be anywhere in the light guiding body 21.

Moreover, a configuration may be employed in which the transmission-wavelength selecting means 222 of each color is directly provided to the through holes that are not provided with light guiding bodies 21.

With the above configuration, color filters are no longer necessary for the sensor 22.

Figure 24A:
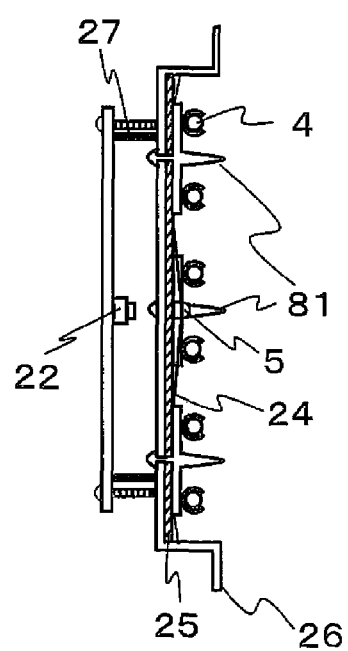
FIG. 24A is a side view of a modified example of the fourth embodiment of the present invention.
Figure 24B:
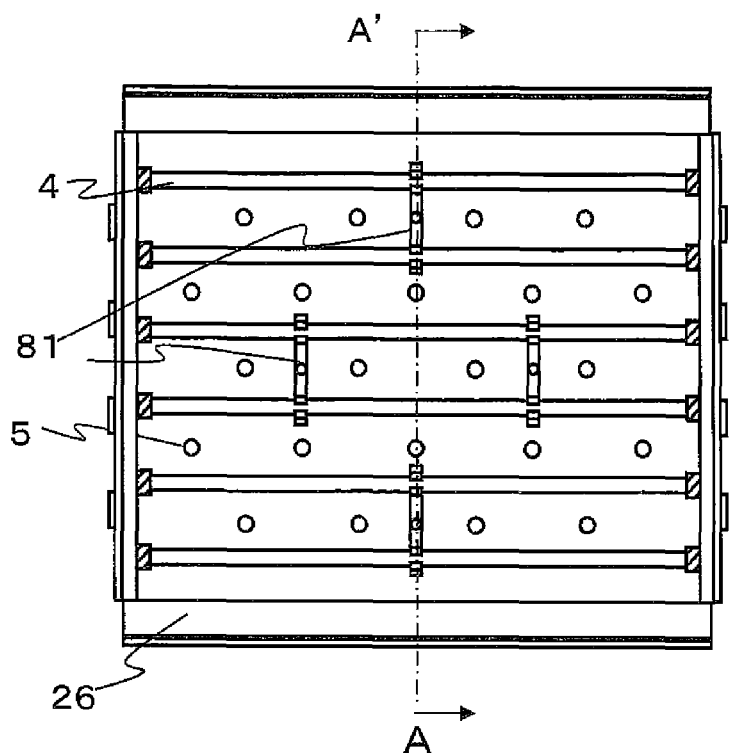
FIG. 24B is a front view of the backlight device of the modified example of the fourth embodiment of the present invention.
Figure 25A:
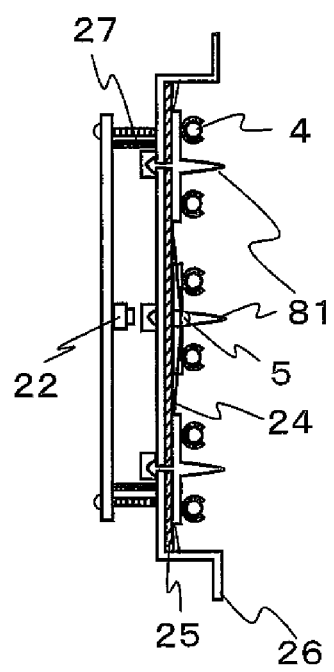
FIG. 25A is a side view of a modified example of a fifth embodiment of the present invention.
Figure 25B:
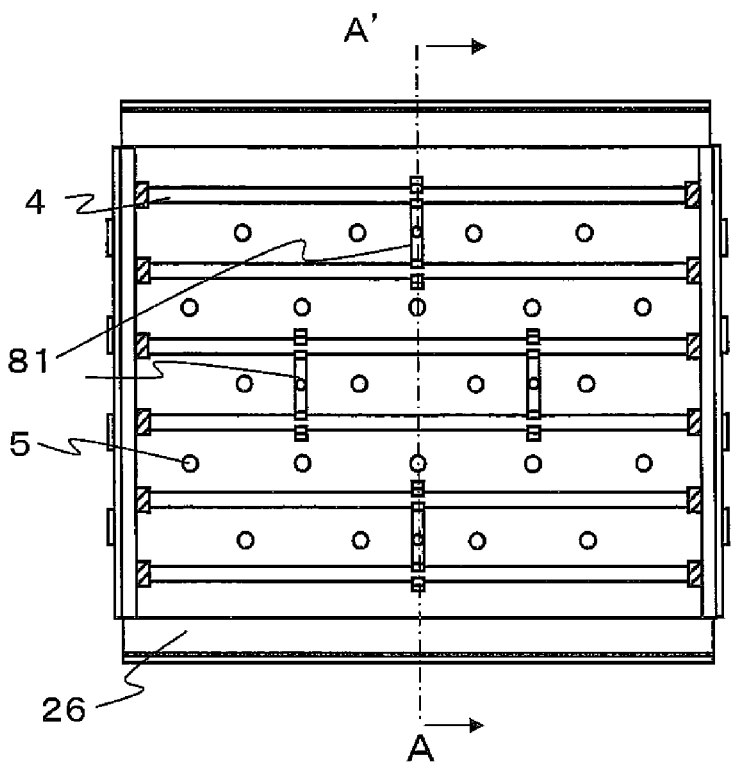
FIG. 25B is a front view of the backlight device of the modified example of the fifth embodiment of the present invention.

Hereinabove, in the third to sixth embodiments, examples have been shown in a case where the light sources are LEDs. Meanwhile, in a case of using fluorescent lamps in addition to the LEDs as light sources, it is preferable that each of the light guiding bodies 21 is formed to be configured of a plurality of holding portions and a base substrate as in the second embodiment, as exemplified in FIGS. 23 to 25.

Additionally, although a plurality of through holes are provided, not all of the through holes require provision of the light guiding bodies, neither do all of the light guiding bodies need to be in the same form.

Figure 26A:
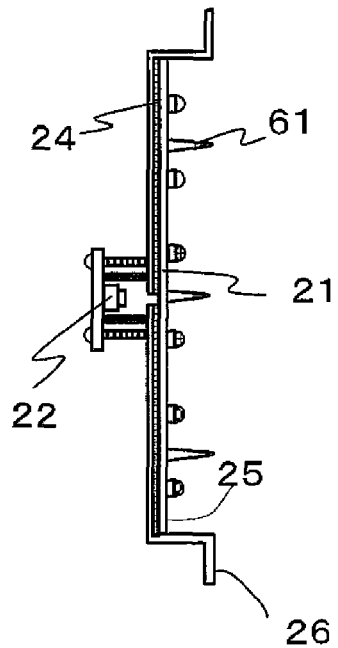
FIG. 26A is a side view showing an example of a backlight device according to the present invention in a case where the light guiding body is in a plate form.
Figure 26B:
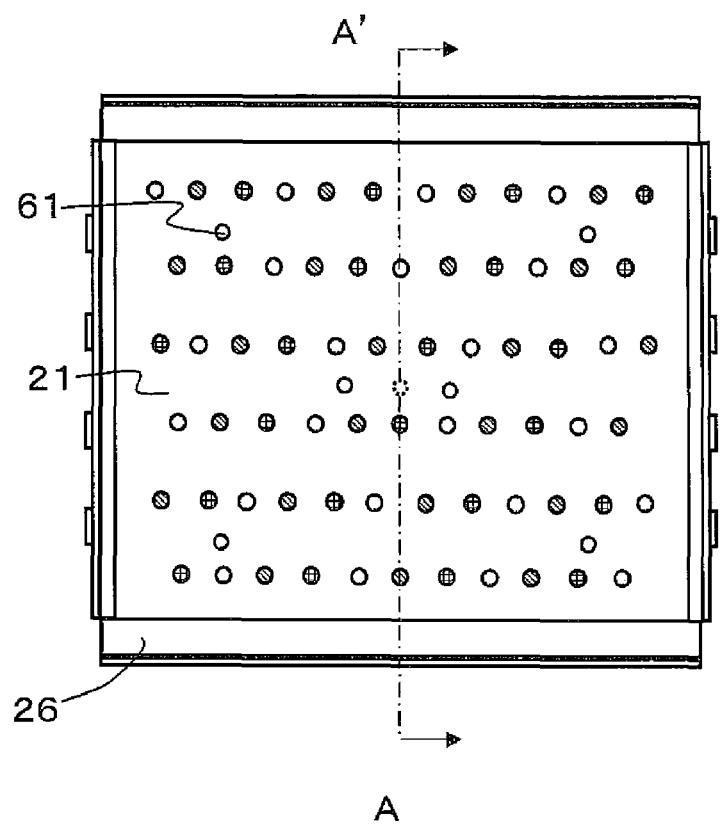
FIG. 26B is a front view showing the example of the backlight device according to the present invention in the case where the light guiding body is in a plate form.

Furthermore, the light guiding body may be in a flat form or the like in the aforementioned embodiments including the first and second embodiments. For example as in FIGS. 26A and 26B, while removing the reflector 24 in FIG. 2 and giving the light source side surface of the chassis 26 a reflecting function, the light source arrangement substrate 25 may be formed of a light propagation member such as transparent acrylic and optical fiber that are not provided with holes. Even with this configuration, appropriate indirect light can be detected with the sensor 22 in the back of the chassis by blocking the through hole 23 completely.

Figure 27A:
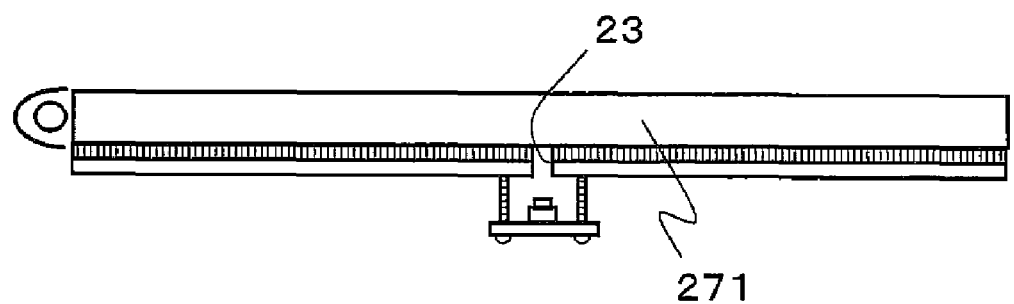
FIG. 27A is an example of a backlight device according to the present invention in a case of the side edge type.
Figure 27B:
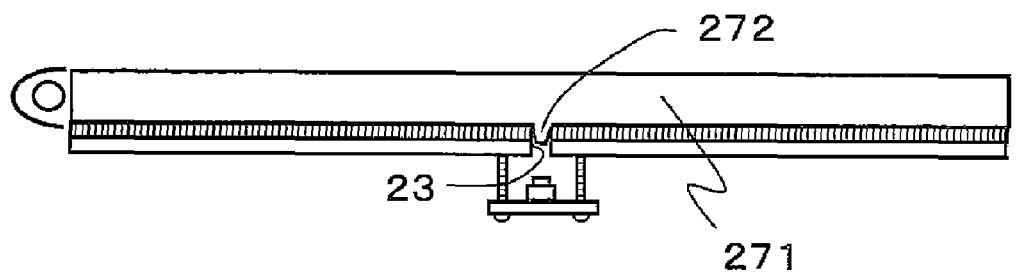
FIG. 27B is an example of a backlight device according to the present invention in a case of the side edge type.

In a case where the backlight device is a side edge type, it is necessary to configure the through hole 23 to be blocked completely with the light guiding plate 271, as shown in FIG. 27A. A configuration as shown in FIG. 27B where a convex portion 272 is provided in the light guiding plate 271 and the convex portion is fitted to the through hole 23 is effective, because the convex portion 272 comes to function as a light guiding means for guiding light to the sensor 22 as well as a locating means for preventing the light guiding plate from moving. Although the through hole and the convex portion 272 are located in the center in the drawing, the two may preferably be provided at the edge in consideration of an irregularity in the brightness of the screen. Alternatively, a configuration may be employed in which a plurality of through holes and convex portions 272 are provided.

Seventh Embodiment

Figure 28:
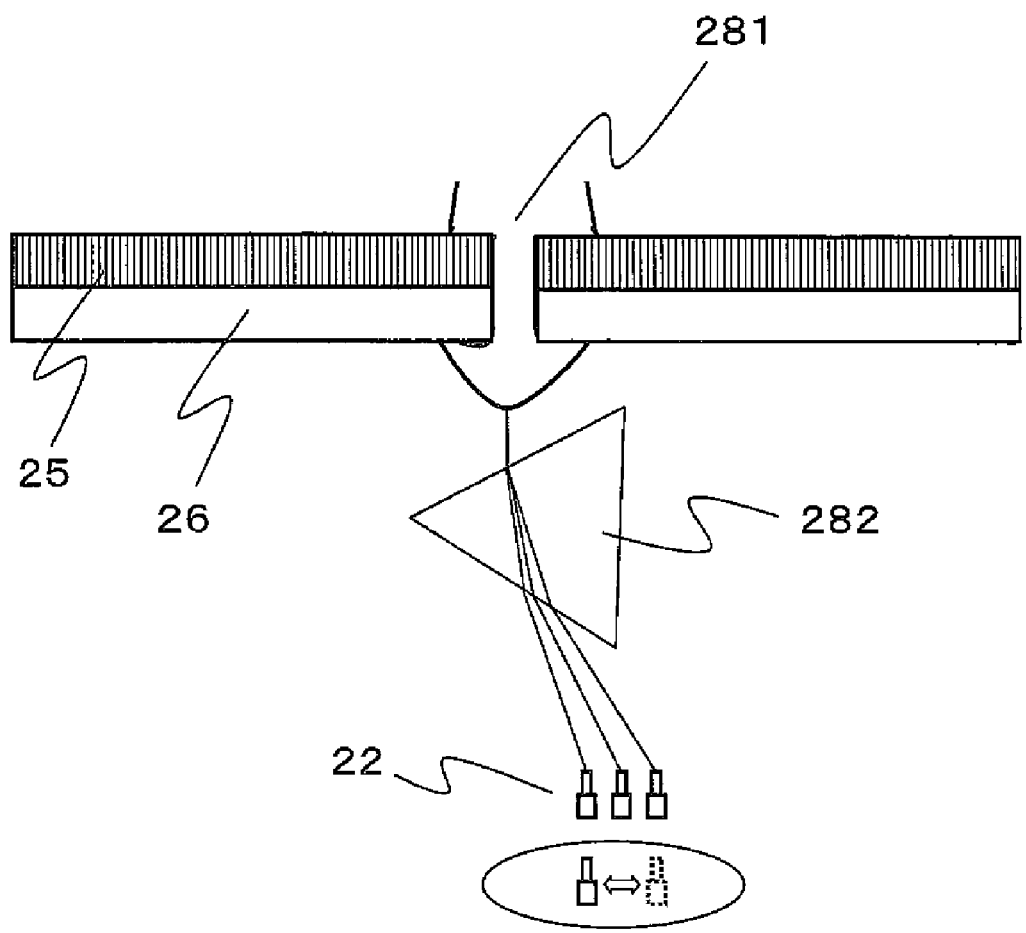
FIG. 28 is a diagram showing a configuration of a light guiding body and a periphery thereof in the seventh embodiment of the present invention.

A description will be given for a backlight device serving as an illumination device according to a seventh embodiment with reference to FIG. 28. In the configuration in FIG. 28, light from a light guiding body 281 having passed through to the opposite side to the light source arrangement side of a light source arrangement substrate 25 is separated into colors by a color separation means 282 such as a prism, and thereafter each of the colors are detected.

With this configuration, color filters are no longer necessary for a sensor 22 since respective lights of red, green and blue can be obtained by the difference between refractive indexes in the light having passed through the prism 282.

In addition, the sensor 22 that was configured of the red sensor, the green sensor and the blue sensor may be replaced by a single sensor such as a photodiode. By reading sequentially, light of a plurality of colors having passed through the prism by moving the single sensor, the configuration of the sensor can be simplified.

Note that the prism 282 may be configured to be moved instead of the sensor.

Additionally, in the configuration for detecting red, green and blue light by use of the above-mentioned prism 282, light having directly passed through a through hole provided in a chassis or the like may be detected, instead of detecting light having passed through the light guiding body 281. Further, a configuration may be employed in which the detection is made by providing the prism 282 in the light source side of the light source arrangement substrate 25, in locations shown in the conventional examples as shown in FIG. 32, or the like.

Hereinabove, an explanation has been given for the present invention by taking a liquid crystal display device and a backlight device as examples of the light source control device. However, the invention is not limited to these, and may also be applied to a general illumination or the like that requires constant chromaticity.

The above-mentioned light guiding body may not be acrylic, and may be formed of any material that allows light to pass through.

In addition, as to the arrangement location, the color sensor 22 does not necessarily face the through hole 23.

Figure 29:
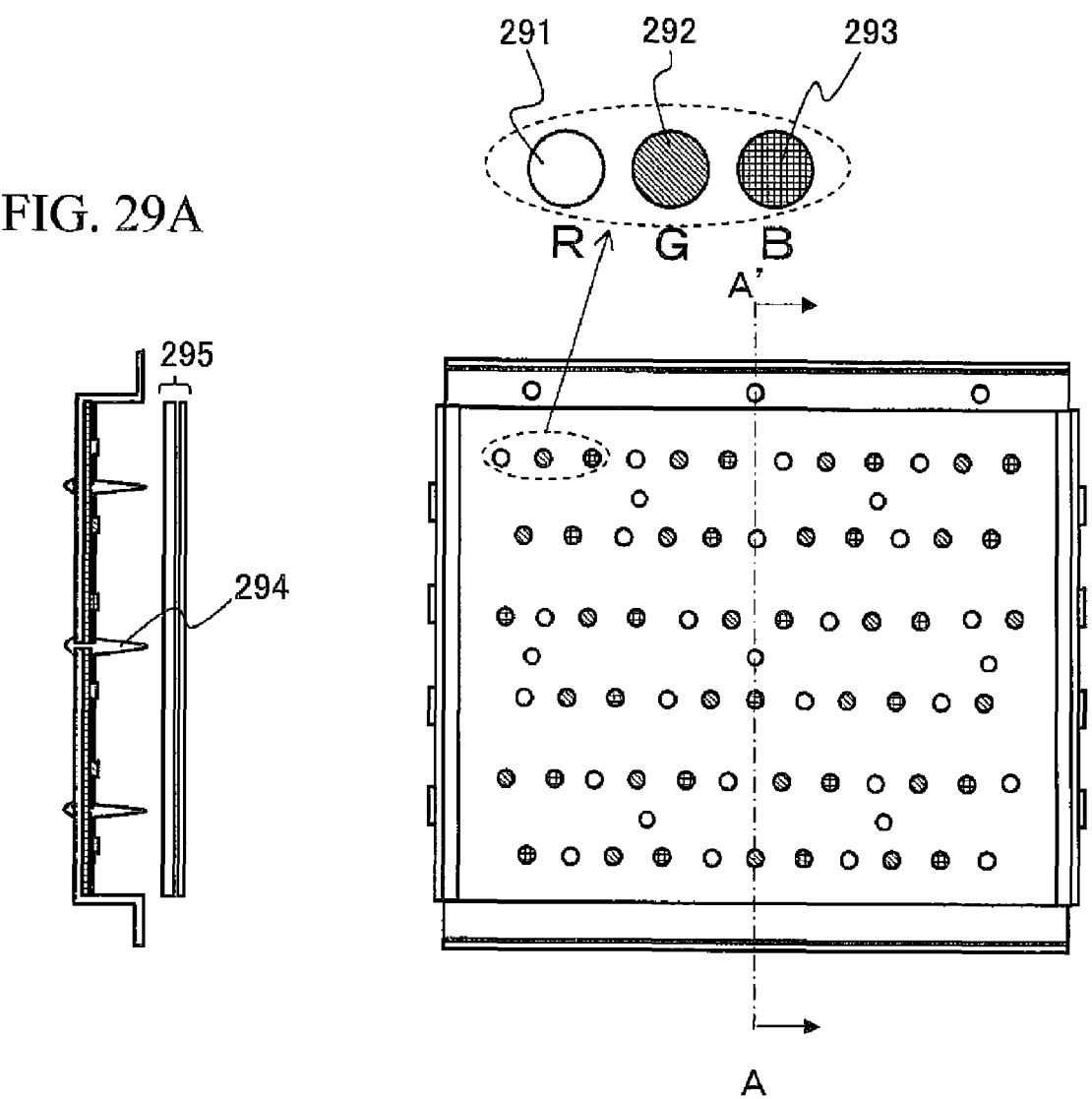
FIG. 29A is a side view of a conventional backlight device.
FIG. 29B is a front view of the conventional backlight device.

Although the reflector 25 is arranged in a slightly tilted manner in the description of each of the above embodiments, the reflector 24 may be formed in a planar shape without the tilt, as in FIGS. 7, 29A and 29B. Moreover, the light source arrangement substrate 25 may be configured to also serve as the reflector 24. The reflector 24 may be reflective sheeting or reflective paint instead of a plate.

INDUSTRIAL APPLICABILITY

The present invention is applicable to a liquid crystal display device, a backlight device to be used therein, and the like.

The invention claimed is:

1. A light source control device which includes a light detection device for detecting emission brightness of a plurality of light sources emitting different colors of light, and which controls emission brightness of at least one of the plurality of light sources on the basis of a detection result of the light detection device, the light source control device comprising:
   a through hole that extends through a reflective member that reflects light emitted from the light source in a predetermined direction and a chassis in which the reflective member is provided; and
   a light propagation member attached to the chassis and the reflective member and being inserted in the through hole, the light propagation member being made of a transparent material, such that light from the light source is propagated through the through hole,
   wherein the light source is disposed at a first side of the chassis, and the light detection device is disposed at a second side of the chassis opposite to the first side.

2. The light source control device according to claim 1, wherein the light propagation member includes a convex portion, and the convex portion is fitted to the through hole.

3. The light source control device according to claim 1, wherein the light propagation member has a height higher than the light source.

4. The light source control device according to claim 1, wherein the light detection device detects light having been separated by light separating means after passing through the through hole.

5. The light source control device according to claim 1, further comprising:
   a housing room for housing the light detection device on the second side of the chassis,
   wherein light emitted from the light source is prevented from passing through the housing room.

6. The light source control device according to claim 1, wherein the reflective member and the chassis include a plurality of through holes.

7. The light source control device according to claim 6, further comprising:
   opening and closing means that individually controls whether or not to input light to the light detection means, for respective light beams passing through the plurality of through holes.

8. The light source control device according to claim 6, further comprising:
   transmission-wavelength selecting means that selects a transmission wavelength of light entering the light detection means, for respective light beams passing through the plurality of through holes.

9. The light source control device according to claim 6, further comprising:
   a back-surface light guiding means that guides light having passed through the plurality of through holes to the light detection means, the back-surface light guiding means being provided on the second side of the chassis.

10. The light source control device according to claim 6, further comprising:
    a housing room for housing the light detection device, the housing room having a size that covers an arrangement area of the plurality of through holes, the housing room being provided on the second side of the chassis,
    wherein light emitted from the light source is prevented from passing through the housing room.

11. The light source control device according to claim 6, further comprising:
    a plurality of light detection devices.

12. The light source control device according to claim 11, wherein light having passed through the plurality of through holes is detected by the plurality of light detection devices.

13. The light source control device according to claim 11, further comprising:
  a plurality of housing rooms for respectively housing the plurality of light detection devices, the plurality of housing rooms being provided on the second side of the chassis,
  wherein light emitted from the light source is prevented from passing through each of the housing rooms.

14. The light source control device according to claim 1, wherein
  the light source includes an LED and a fluorescent lamp, while the light propagation member includes a base substrate and a plurality of holding parts, and
  a positional relationship of the fluorescent lamp is maintained at a predetermined spacing by the plurality of holding parts.

15. An illumination device, comprising:
  the light source control device according to claim 1.

16. A liquid crystal display device, comprising:
  the illumination device according to claim 15; and
  a liquid crystal panel.

17. A light source control device, comprising:
  a plurality of light sources emitting different colors of light;
  a light detection device for detecting emission brightness of the plurality of light sources, and for controlling emission brightness of at least one of the plurality of light sources on the basis of a detection result of the light detection device, the light source control device;
  a chassis accommodating the plurality of light sources therein, the chassis having a through hole;
  a reflective member provided in the chassis for reflecting light emitted by the plurality of light sources; and
  a light propagation member attached to the chassis and being inserted in the through hole, the light propagation member being made of a transparent material, such that light from the plurality of light sources is propagated through the through hole,
  wherein the light detection device is disposed outside the chassis, such that the light has passed through the light propagation member is received by the light detection device.

* * * * *